Aug. 12, 1941.   A. OBERHOFFKEN ET AL   2,251,948
APPARATUS FOR MACHINING WORKPIECES
Filed Jan. 23, 1939   13 Sheets-Sheet 4
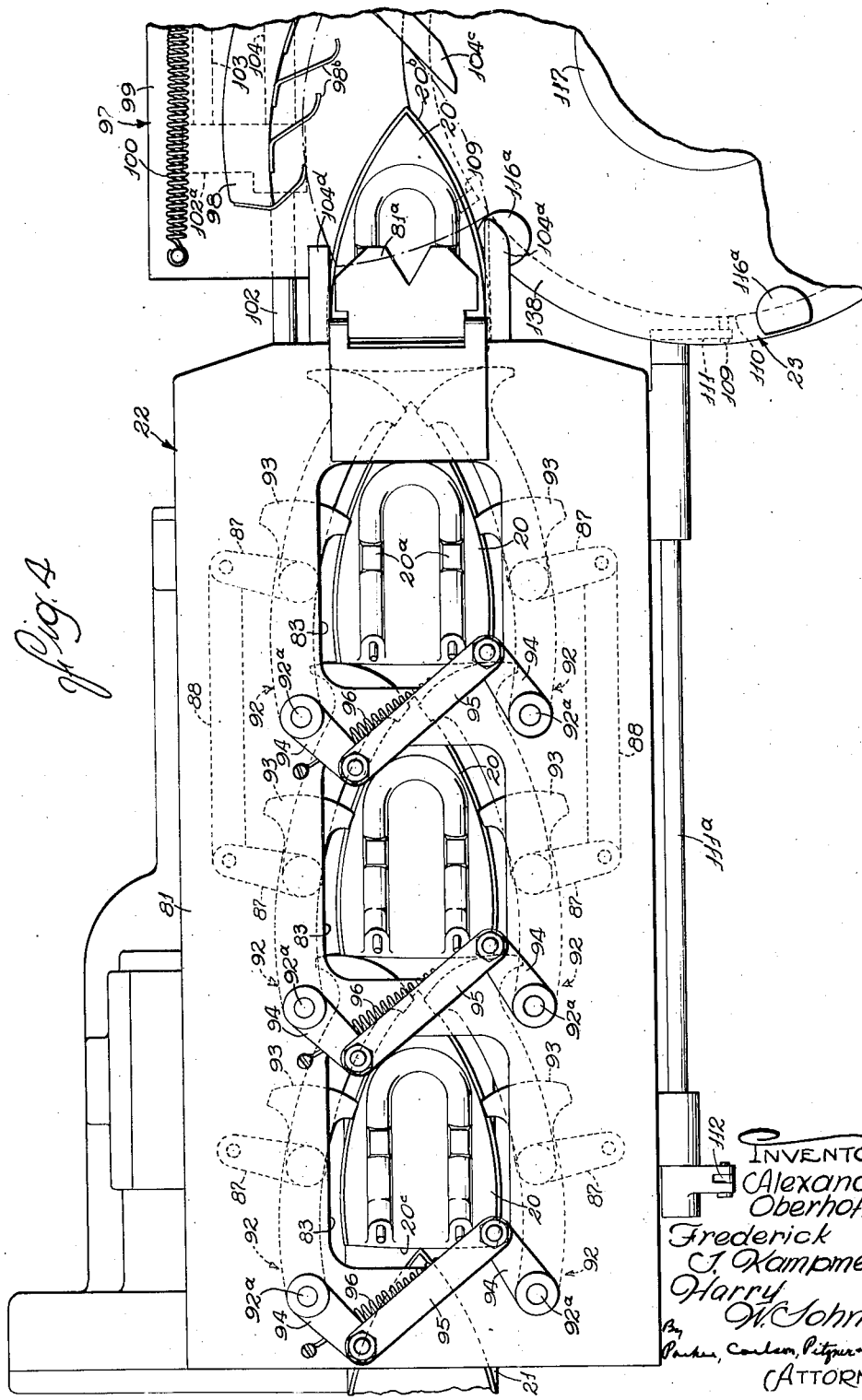

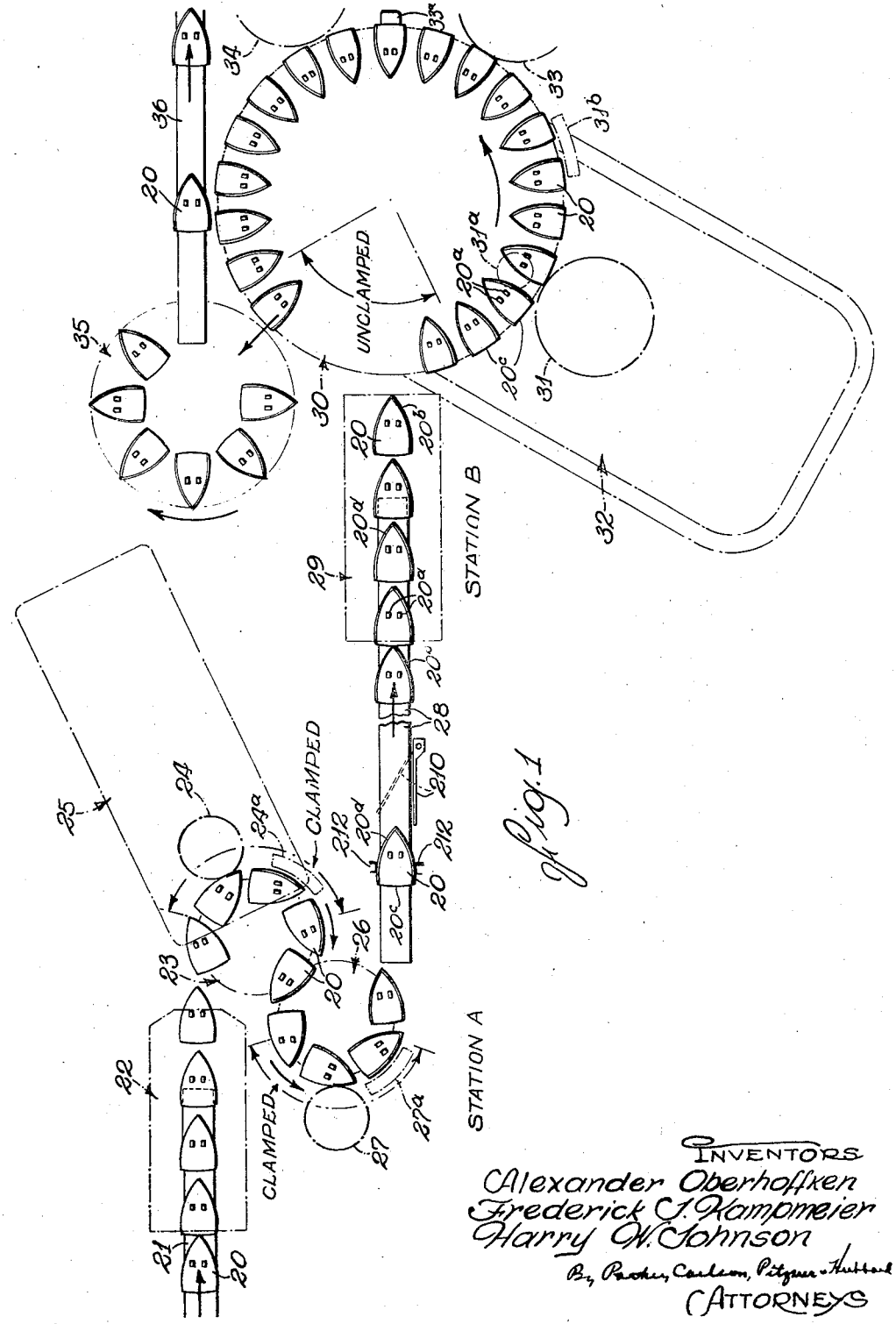

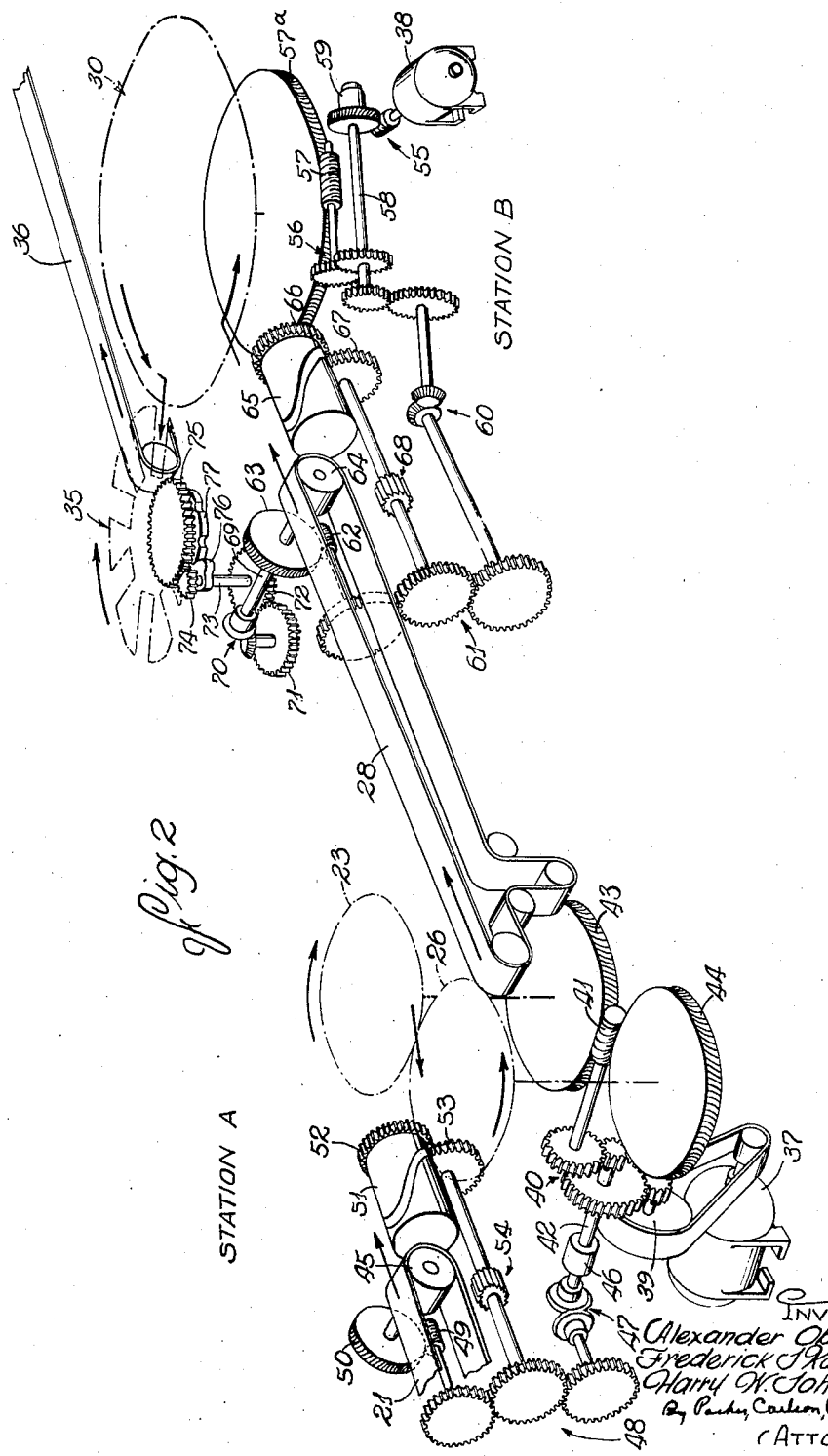

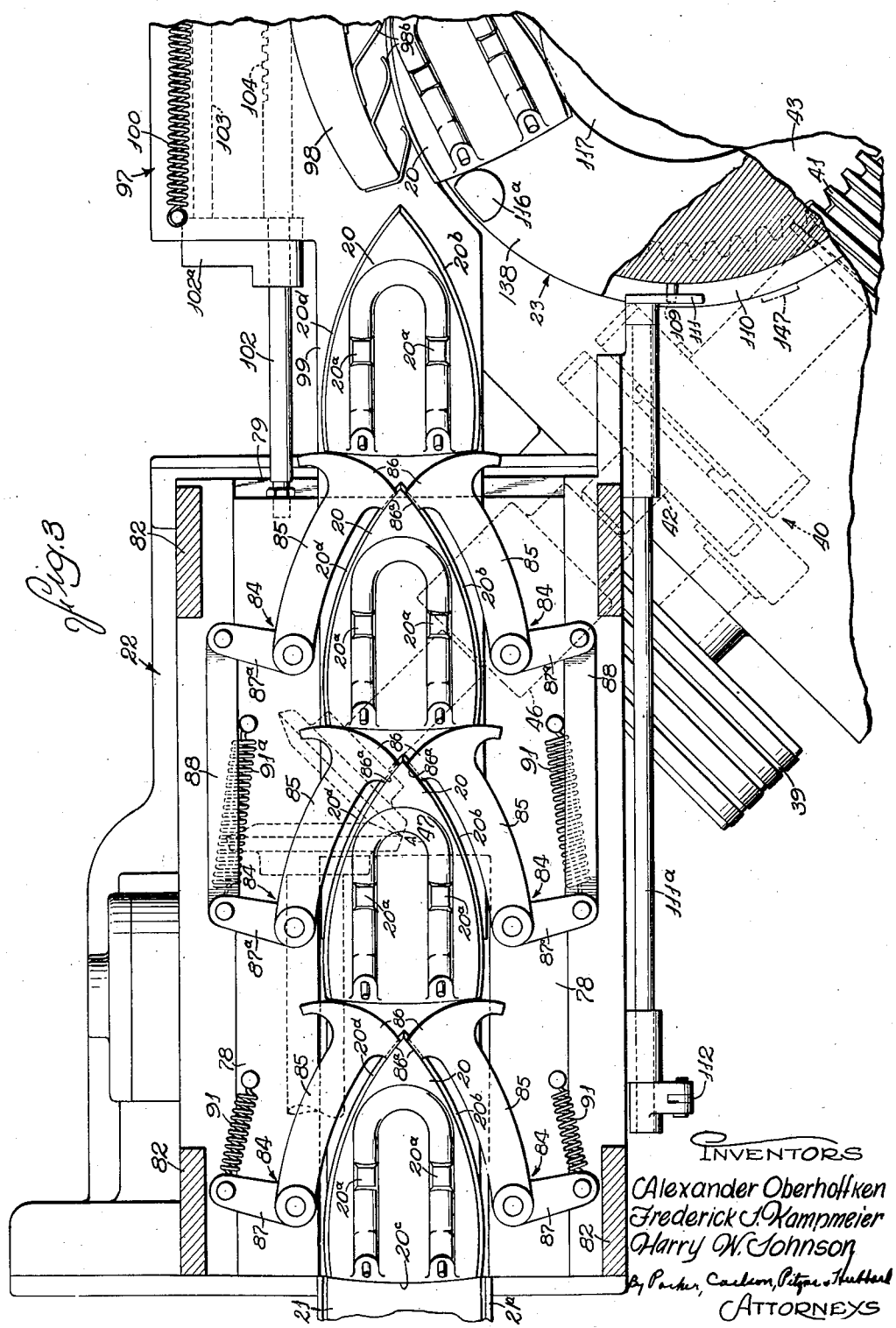

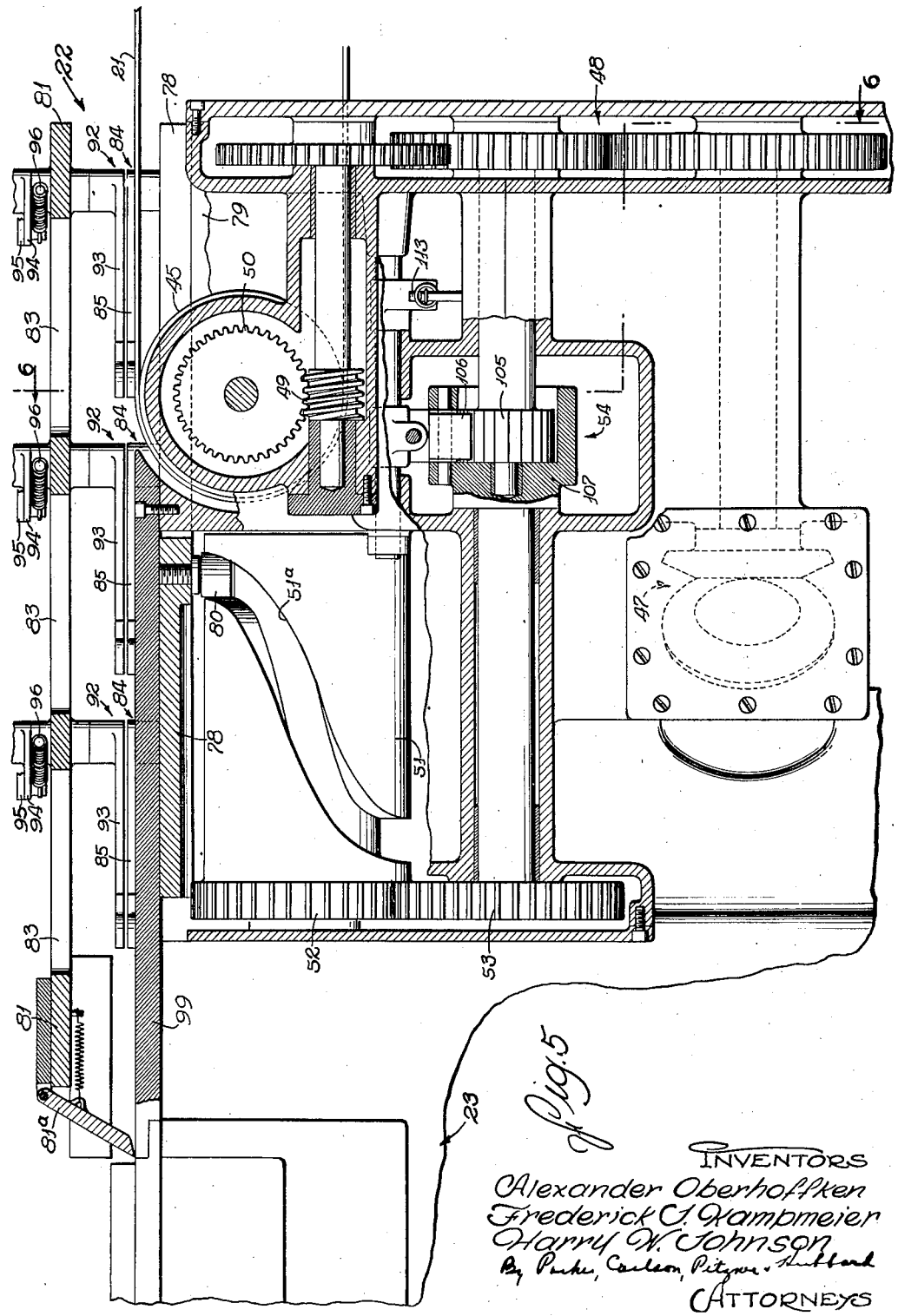

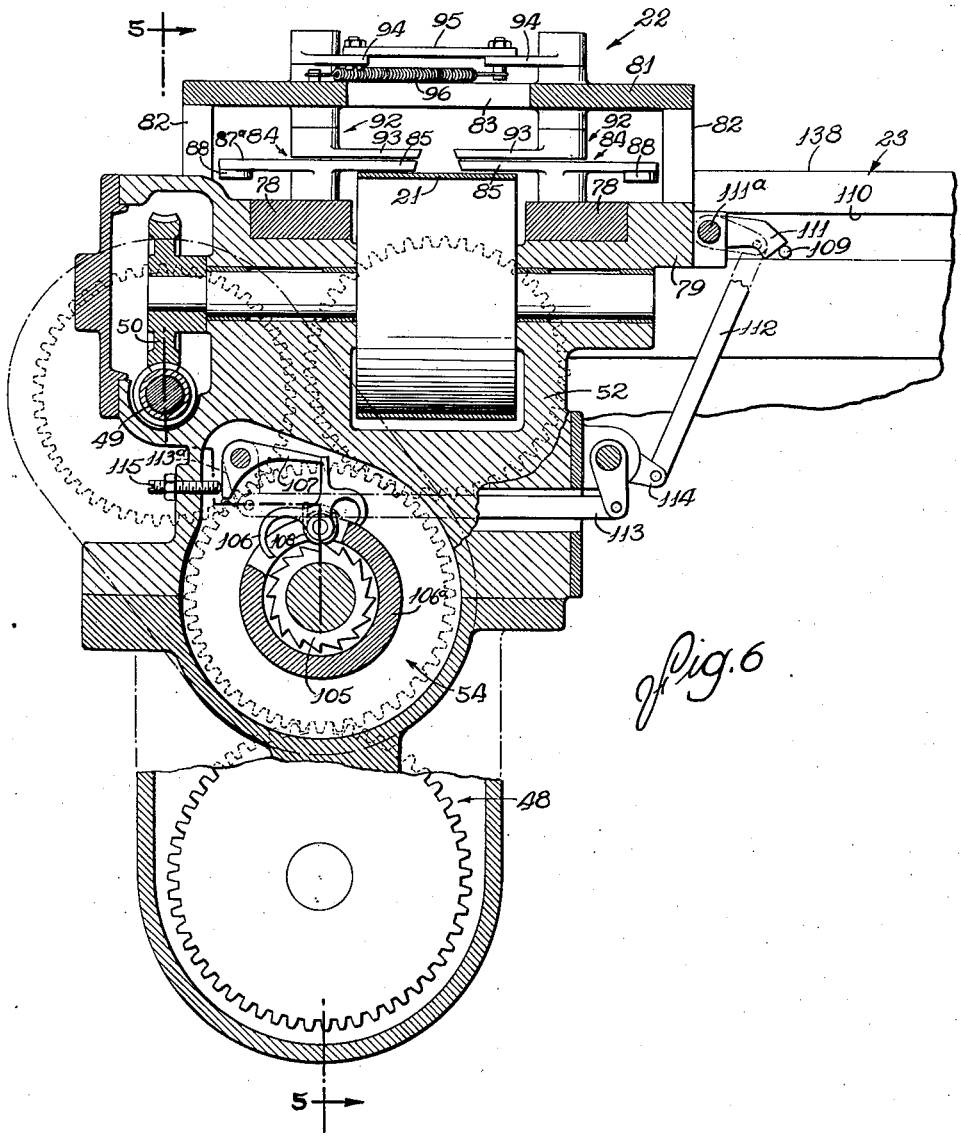

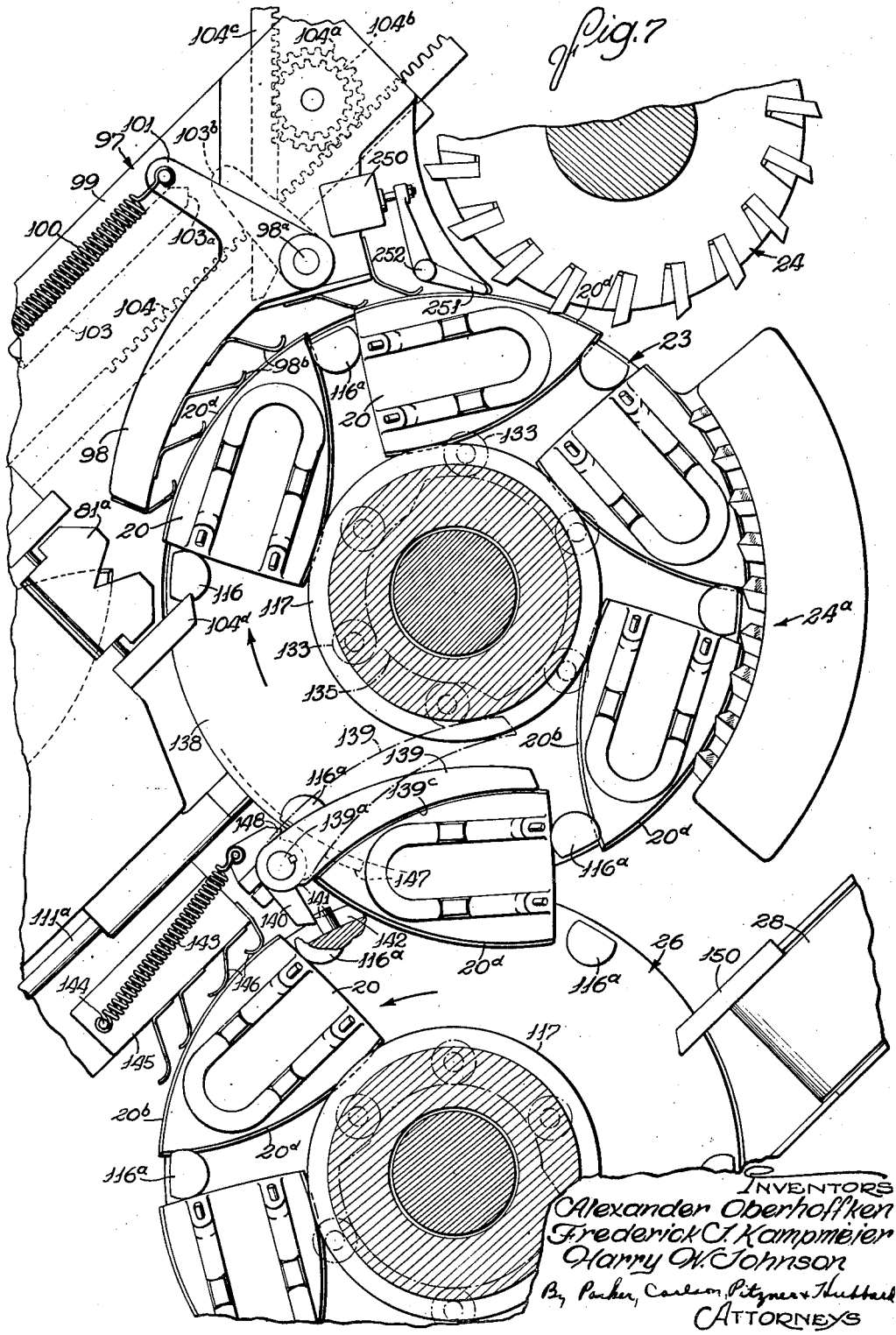

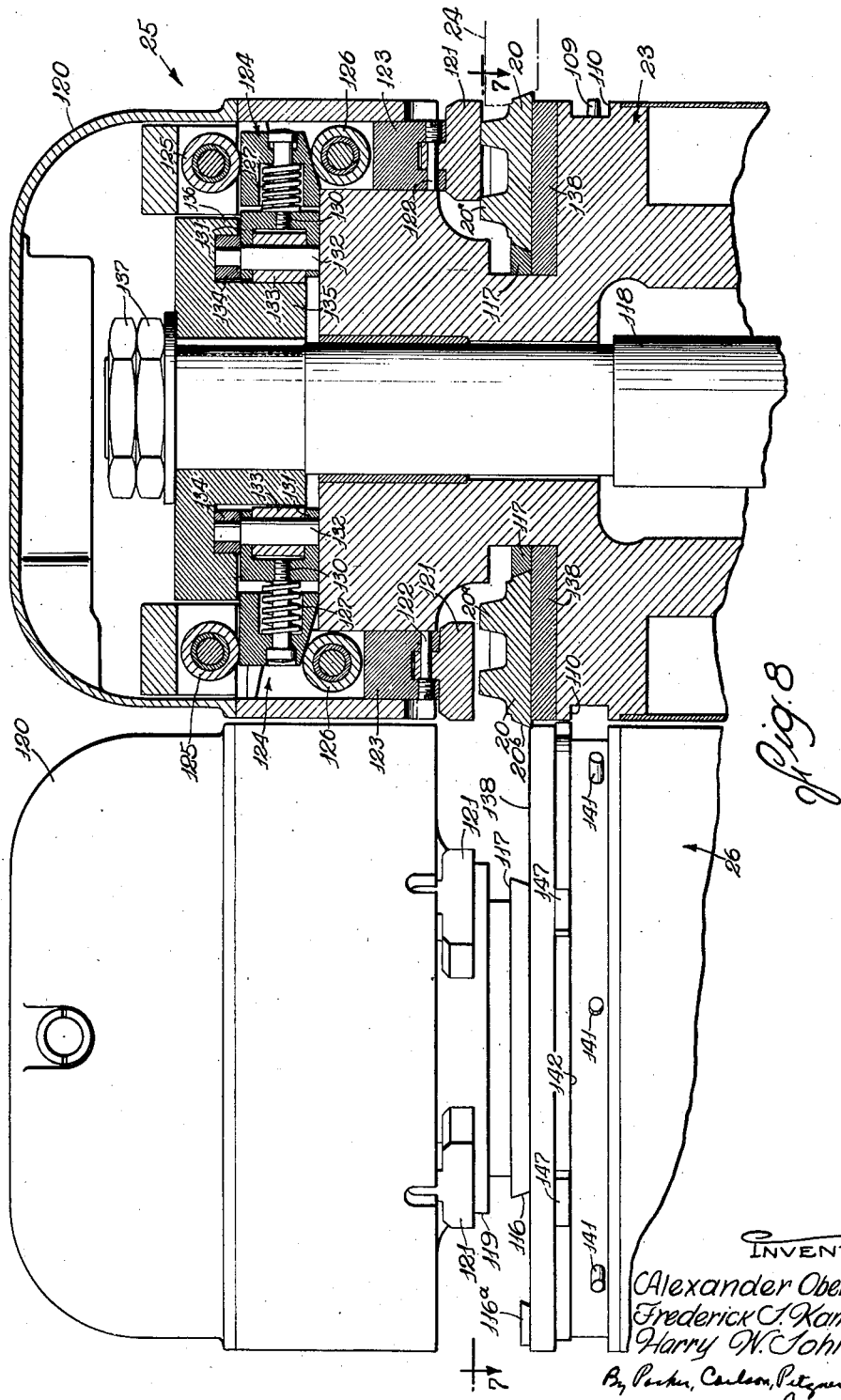

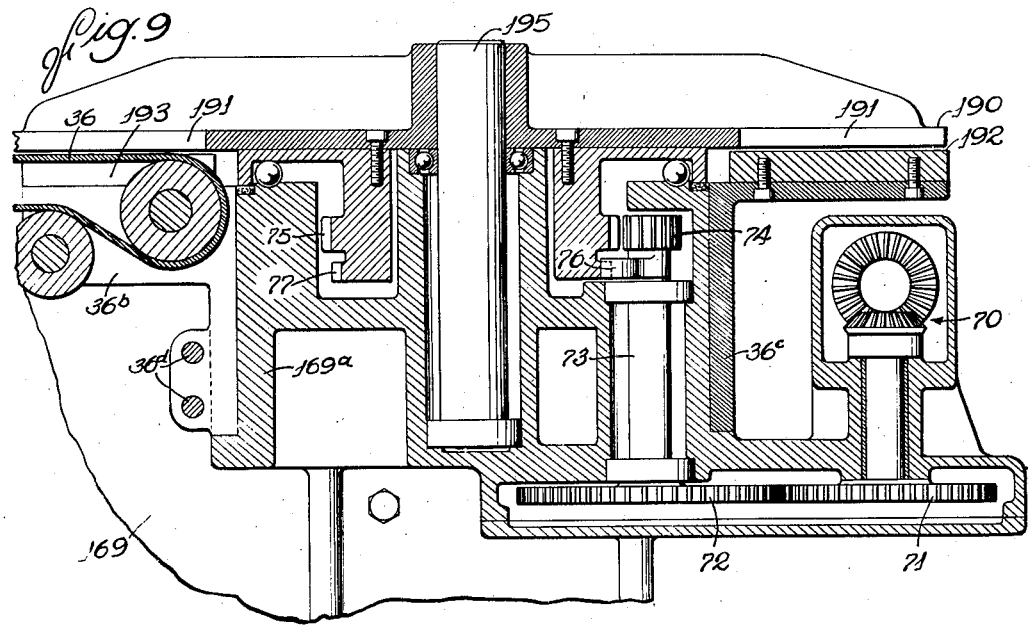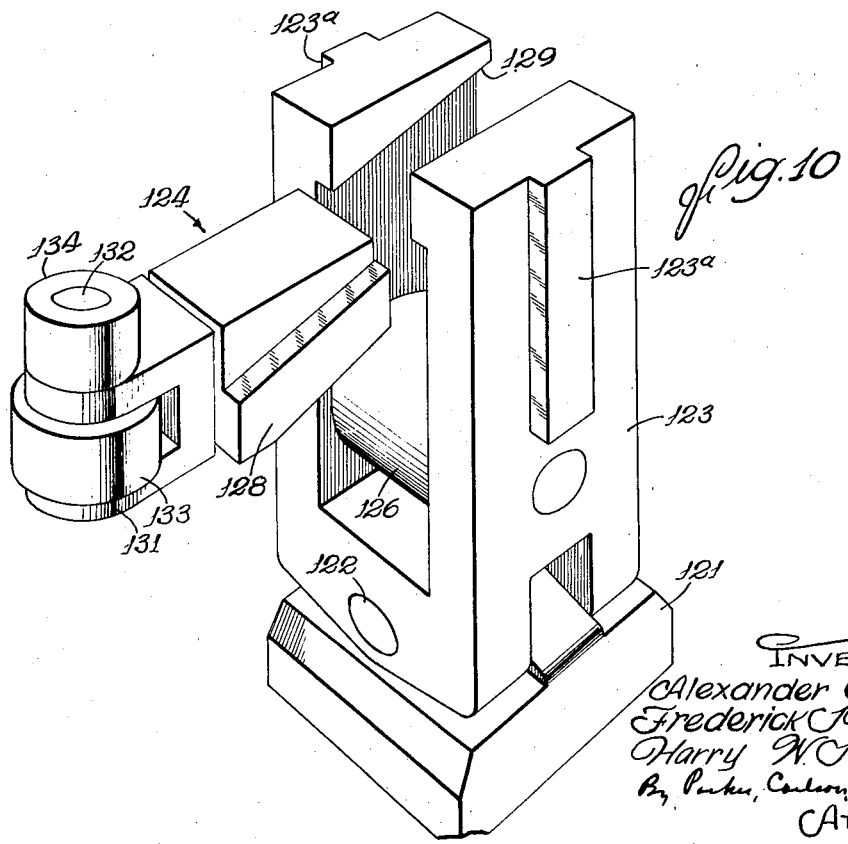

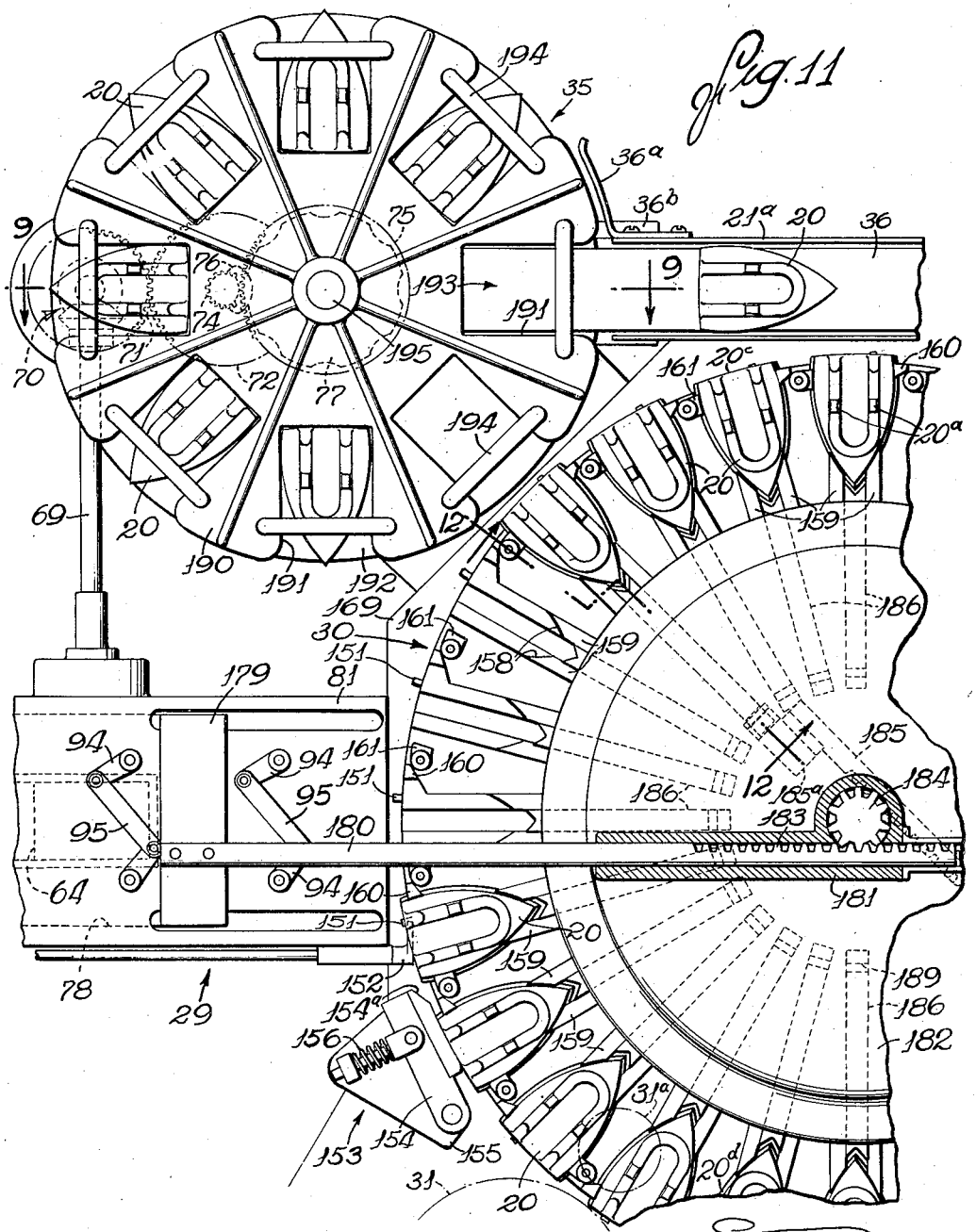

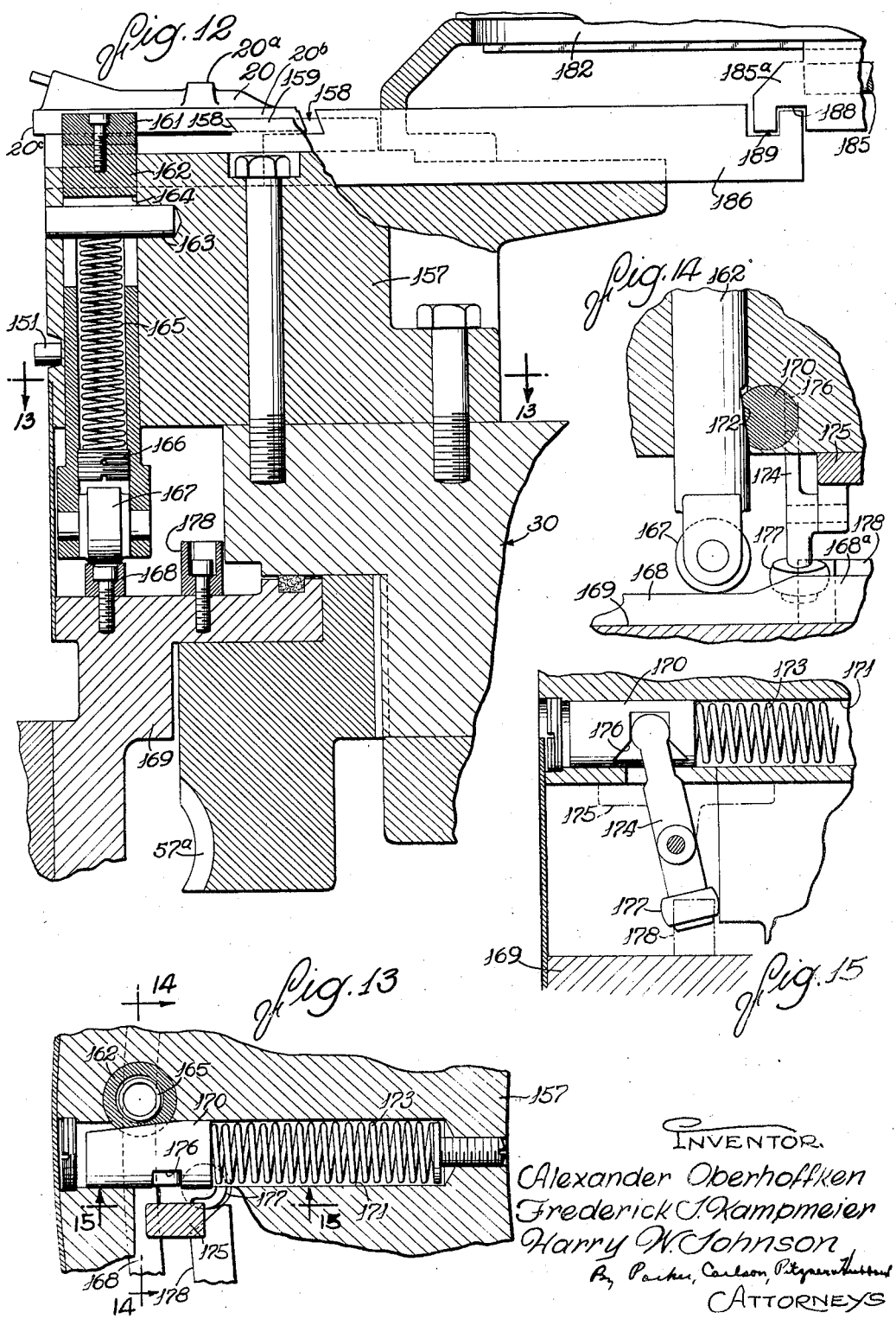

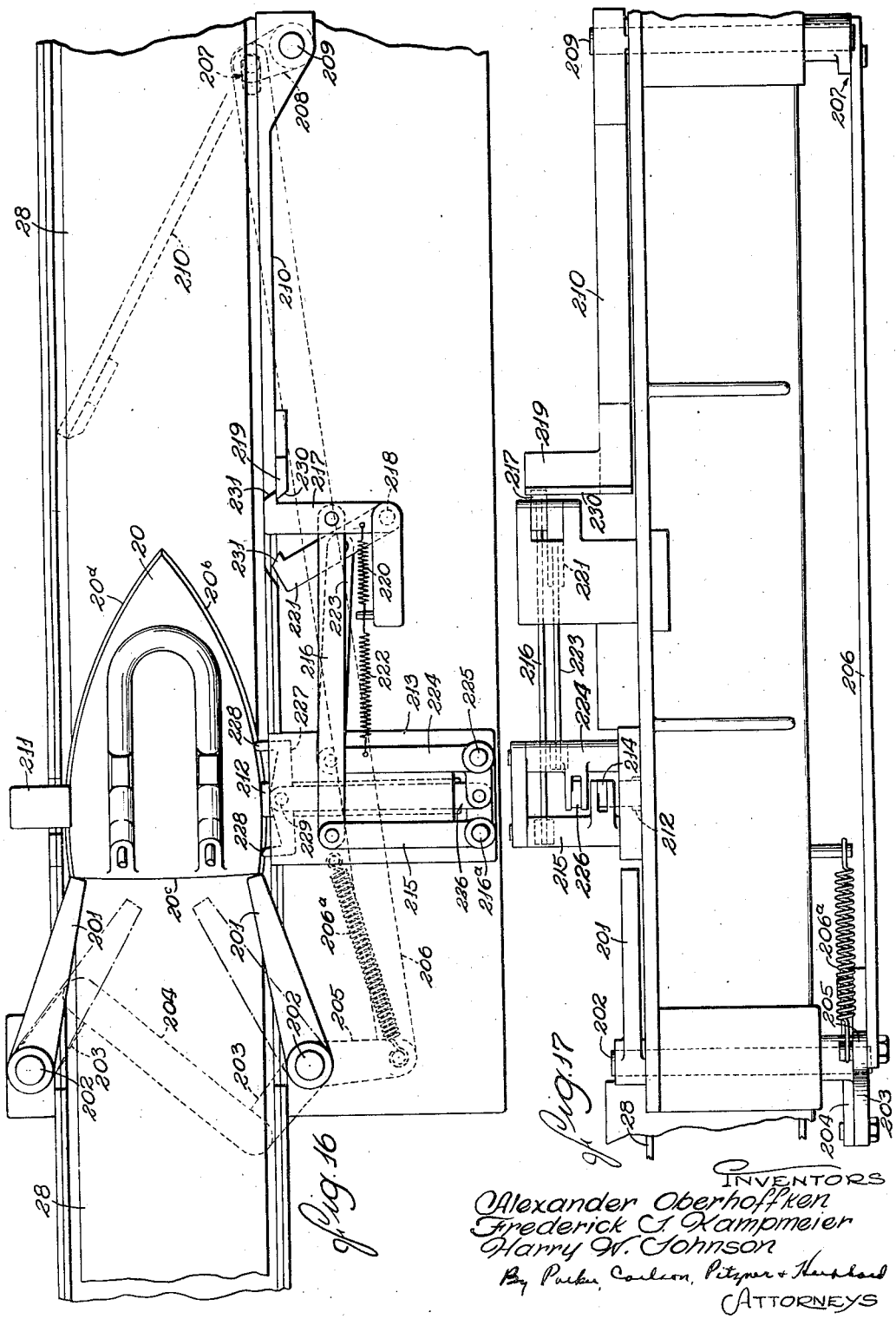

Aug. 12, 1941.  A. OBERHOFFKEN ET AL  2,251,948
APPARATUS FOR MACHINING WORKPIECES
Filed Jan. 23, 1939  13 Sheets-Sheet 13
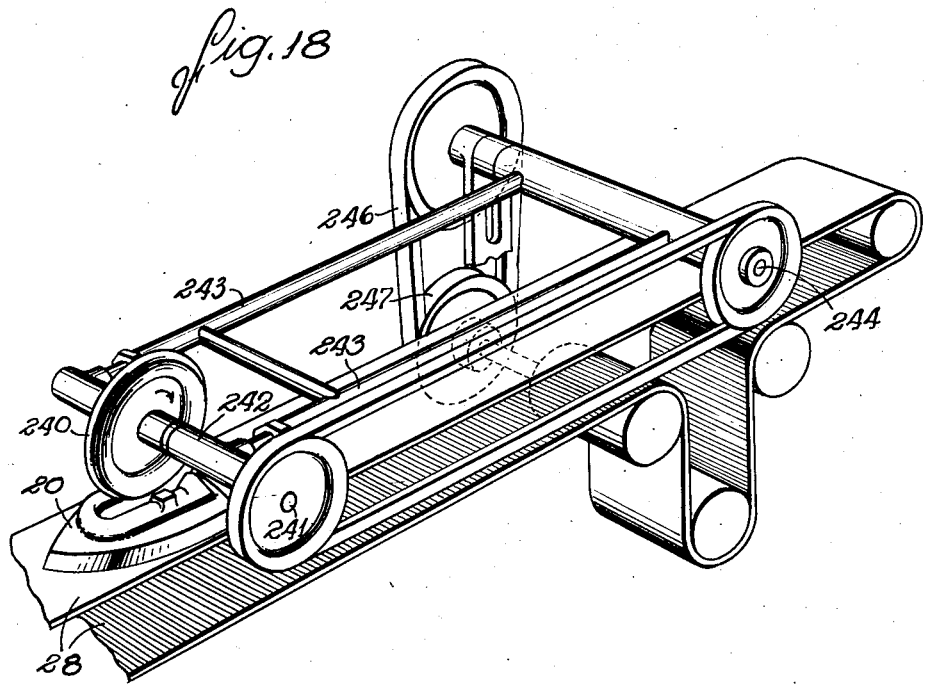
INVENTORS
Alexander Oberhoffken
Frederick C. Kampmeier
Harry W. Johnson
By Packer, Carlson, Pitzner & Hubbard
ATTORNEYS Patented Aug. 12, 1941

2,251,948

UNITED STATES PATENT OFFICE 2,251,948

APPARATUS FOR MACHINING WORKPIECES

Alexander Oberhoffken, Frederick J. Kampmeier, and Harry W. Johnson, Rockford, Ill., assignors to The Ingersoll Milling Machine Company, Rockford, Ill., a corporation of Illinois Application January 23, 1939, Serial No. 252,300

50 Claims. (Cl. 29—38)

The invention relates to an apparatus for machining work pieces, and more particularly to an automatic machine tool production line for performing a series of metal-removing operations on work pieces at one or more stations with automatic handling of the work at and between the several stations.

In mass production factories, it is frequently necessary to perform a series of metal-removing operations on a large number of substantially duplicate work pieces. In many instances, the various metal-removing operations are individually of different character as, for example, rough milling, finish milling, buffing or grinding as well as boring, drilling or tapping. Furthermore, the operations usually must be performed upon different parts of work pieces which generally are irregularly shaped or unsymmetrical. This latter consideration makes it necessary to locate each successive blank accurately with respect to each metal-removing device so that the latter will operate on the work piece at the required point. The general aim of the present invention is to accomplish the machining of such unsymmetrical work pieces efficiently and at greater speed than has been possible heretofore.

More particularly, it is an object of the present invention to provide a novel machine tool apparatus in which a series of substantially duplicate work pieces are automatically and progressively fed through one or more operating stations and properly located and held in different angular positions at such stations during the performance of metal-removing operations thereon so that the apparatus serves to carry out the entire series of metal-removing, work transferring, positioning, and holding operations as parts of one complete integrated process without the necessity of manual handling of the work pieces or individual machine controls from beginning to end.

Another object is to increase the speed at which the slower machining operations such as milling may be performed in automatic process machining. In carrying out this object, provision is made for milling the work pieces while they are held in closely spaced relation and move continuously in an orbital path.

A further object is to provide a novel mechanism for taking positive control of the work pieces and transferring them onto a continuously rotating carrier without interrupting the latter's movement.

Still another general object of the invention is to provide a metal-removing apparatus of the character described embodying an improved arrangement for accurately controlling the positioning of the work pieces with respect to their path of travel through the machine, and consequently, with respect to the metal-removing devices which operate upon them during such travel.

Another more specific object is to provide, in an apparatus of the type set forth, a novel unloading mechanism for receiving the work pieces discharged from a rotating work support and initiating their transfer in a particular selected direction corresponding to the position the work piece is to occupy at the next machining station.

Still another object is to provide for automatic ejection from the production line of those work pieces which, after being machined at one station, are not adapted to fit properly in the fixture at the next station.

The invention also resides in the novel construction of the loading and unloading mechanisms, the manner of actuating the same with proper timing, and the automatic sizing mechanism.

Further objects and advantages of the invention will become apparent as the following description proceeds, taken in connection with the accompanying drawings, in which—

Figure 1 is a diagrammatic layout of a machining apparatus embodying the invention.

Fig. 2 is a diagrammatic view of the drive mechanisms for the apparatus of Fig. 1.

Fig. 3 is a plan view of the first station loader with part of the top broken away.

Fig. 4 is a plan view of the loader shown in Fig. 3 after partial loading movement.

Fig. 5 is a sectional view taken along the line 5—5 of Fig. 6.

Fig. 6 is a sectional view taken along the line 6—6 of Fig. 5.

Fig. 7 is a horizontal sectional view of the work holders for the first machining station in Fig. 1, the section being along the line 7—7 of Fig. 8.

Fig. 8 is a side elevation of the machine at station A, part being shown in vertical section.

Fig. 9 is a vertical section along the line 9—9 in Fig. 11.

Fig. 10 is an enlarged exploded perspective view of part of the clamp mechanism for the tables of Fig. 8.

Fig. 11 is a plan view partly in section of portions of the loader and rotating work holder together with the unloader included in the second machining station.

Fig. 12 is a partial vertical sectional view along the line 12—12 in Fig. 11.

Fig. 13 is a partial sectional view along the line 13—13 in Fig. 12.

Figs. 14 and 15 respectively are detail side elevations and plan views of actuating cam mechanisms for the work table clamps, the sections being taken along the lines 14—14 and 15—15 of Fig. 13.

Figs. 16 and 17 are plan and elevational views of the sizing mechanism interposed between the two work stations.

Fig. 18 is a perspective view of a modified form of drive for feeding the work pieces through the sizing mechanism.

GENERAL ORGANIZATION OF APPARATUS AND RÉSUMÉ OF OPERATION

The invention has been exemplified herein as applied to the performance of a series of metal-removing operations on the cast iron bases or so-called shoes of electric flatirons. Such shoes indicated generally by the numeral 20 typify the kind of work piece for which the novel apparatus herein contemplated is best suited since they constitute work pieces of medium size or weight, are irregular in shape, and require different metal-removing operations to be performed at a plurality of different points thereon. It will be understood, therefore, that the invention is by no means limited to the particular work pieces selected for illustrating the invention, and that the appended claims are intended to cover all modifications, variations and alternative constructions falling within the spirit and scope of the invention.

Flatiron shoes, like many other work pieces made on a quantity production basis, are too large and irregular in shape to be handled by hopper feed mechanisms. On the other hand, step-by-step advance of the work pieces through a series of work stations as is the common practice in the process machining of large and relatively heavy work pieces is slow and greatly limits the output rate. In the improved apparatus herein disclosed, the work pieces pass through successive stations in a substantially continuous stream and at a very rapid rate. In fact, it has been found possible to perform all of the milling, drilling, tapping, grinding, and buffing operations, numbering more than twenty, that are required for flatiron shoes at a rate as high as 480 pieces per hour.

Referring particularly to Fig. 1, a portion of a completely automatic machine has been illustrated which in its entirety receives rough castings and performs substantially all of the various machining operations required for finishing flatiron shoes, including the rough and finishing milling of the bottom and sides as well as buffing or polishing certain areas, milling of the top pads, drilling and tapping of holes in the top pads, and cutting a button nook slot in the nose of the shoe. For purposes of illustration and explanation of the present invention, it was not believed to be necessary to show the entire machine and, accordingly, only two intermediate stations in the line have been included. These comprise stations A and B, at the first of which the two side edges 20$^b$ and 20$^d$ of the flatiron shoes are successively milled and at the second of which the top pads 20$^a$ are milled and the butt ends 20$^c$ are milled and buffed.

The manner in which the work pieces are advanced plays an important part in the present method of machining since it is so correlated with the machining operations that maximum speed is combined with precision of positioning. The direction of flow of the stream of work pieces to and through stations A and B will be apparent from Fig. 1. In particular, the work pieces, shown as flatiron shoes 20, approach station A along a continuously moving belt conveyor 21 on which they travel in upright position with their noses pointed forwardly. They are held in this relation by side walls 21$^a$ of the conveyor track. An intermittently operable loader 22 receives and takes positive control of the work pieces as they approach each operating station and finally transfers them one by one into pockets on a table or work support 23 which rotates clockwise (as viewed in Fig. 1). The table 23 rotates continuously and the loader 22 is actuated in timed relation with it. The details of these and other general elements of the machine are, of course, described hereinafter in greater detail.

The work pieces are projected onto the table 23 along a path generally tangential to the circular path of the work holders or chucks on the table so that one side edge 20$^d$ of each work piece will be exposed at the table periphery. Each work piece is automatically clamped in position on the table 23 and its exposed side edge 20$^d$ is presented to a cutter 24 of a milling machine 25 (Fig. 8) and also to a broaching tool 24$^a$. The curvature of the surfaces milled on the work pieces is determined by the radial displacement of the cutter from the axis of rotation of the table 23. After passing the milling cutter 24 and the broach 24$^a$, the work pieces 20 continue in a generally figure eight or S-shaped path which necessitates a transfer to a second and oppositely rotating table 26 so as to expose their opposite sides 20$^b$ for milling by a second rotating cutter 27 and finishing by a broach 27$^a$. The transfer between tables involves automatic unclamping from the table 23, lateral shifting to the table 26, and clamping thereon. After the work pieces 20 pass the broach 27$^a$, they are automatically unclamped and discharged onto a second continuously moving belt conveyor 28 by which they are carried, pointed end forwardly, to the next operating station.

At station B, the work pieces are received by a second loader 29 substantially identical with the loader 22. In each case, the conveyors 21 and 28 travel at a speed slightly in excess of the loading speed of their associated loader so that work pieces will accumulate in advance of the loaders and always be waiting to enter the latter. The conveyor belt slides beneath the work pieces awaiting entrance into the loader and holds them in abutting end-to-end relation. The second loader 29 works in timed relation to an associated continuously rotating table or work support 30 which turns in a counterclockwise direction (as viewed in Fig. 1). Peripheral pockets on the table 30 receive the pieces 20 which are thrust radially into the pockets, nose first, so as to expose the butt ends 20$^c$ of the work pieces for machining. After being clamped, the work pieces on the table are carried past a rotating milling cutter 31 and a broach 31$^b$ of a machine 32 and then past rotating buffing or polishing wheels 33 and 34. Grease for facilitating polishing may be applied automatically to the machined surface of each work piece as by a wick type applicator 33$^a$. In addition, the work pieces pass beneath a face milling cutter 31a which mills the pads 20a on their tops. In order to position the work pieces for proper entrance into fixtures at the next operating station in the line, they are unloaded successively from the table 30 into a fixture 35 having pockets therein which receive the work pieces 20 with their noses facing radially outward. The fixture 35 operates to turn the pieces around clockwise as viewed in Fig. 1 and then discharges them onto a third continuously moving belt conveyor 36 along which they move in upright and forwardly facing position to the next station.

A continuously moving line of closely spaced work holders is preferred for milling operations which are inherently slow and most likely therefore to limit the production capacity of the entire line. In performing drilling or tapping operations, however, which are quite rapid as compared to milling, the work holders may be indexed through an orbital path rather than being moved continuously.

In order to insure a positive timing for, as well as a simple interlocking of, the cooperating elements at each station, they are preferably driven by common power actuators shown herein (Fig. 2) as electric motors 37 and 38. Separate motors, interlocked, if desired, with the feed motors 37 and 38 may be provided (not shown herein) for the various milling cutters and buffing wheels or other machining devices. In general, the work supporting tables 23, 26 and 30 are moved continuously as are the conveyor belts 21, 28 and 36. The loaders 22 and 29 have an intermittent shuttle motion and are actuated under the control of their associated tables 23 and 30 so as to be timed accurately with the movements thereof. The turn-around or unloader fixture 35 is indexed with a step-by-step motion in timed relation to the continuous rotation of the table 30 and at a speed such that its integrated peripheral speed will equal that of the cooperating work support table 30. Since the diameter of the turn-around table 35 is substantially less than that of the table 30, the angular velocity of the table 35 exceeds that of the table 30. In particular, if the table 30 has twenty-two positions for the flatiron shoes 20 and the table 35 has eight, then the table 35 is indexed through one-eighth of a turn for each twenty-second of a revolution of the table 30.

As to the drive at station A, the motor 37 is belted to a drive pulley 39 drivingly connected through a gear train 40 with a worm 41 and an intermediate shaft 42. Considering first the worm 41, it will be seen that it meshes with worm wheels 43 and 44 located on its opposite sides and to which the work supporting tables 23 and 26 are respectively connected. Accordingly, the latter tables are rotated in opposite directions and at substantially constant equal speeds. Similarly, the intermediate shaft 42 serves in general to drive the first conveyor belt 21 and the first loader 22. To this end, the shaft 42 is connected with a drive pulley 45 for the conveyor belt 21 through an overload slip connection 46, bevel gears 47, intermediate gearing 48, a worm 49 and worm wheel 50. The shuttle motion of the loader 22 is, on the other hand, achieved by means of a barrel cam 51 rotated by gears 52—53 through the medium of a single revolution clutch 54 which is, in turn, driven from the intermediate gearing 48. As will hereinafter appear in greater detail, the clutch 54 is tripped by the table 23 so as to cause the barrel cam 51 to be rotated, and thereby cause the loader to inject the next work piece into the work support table 23, at predetermined points in the rotative movement of the latter. After the clutch 54 has completed one revolution, it automatically releases so that the loader 22 remains at rest until the clutch is again tripped by further movement of the table 23. A precise timing of the loader actuation with respect to the continuous movement of the table 23 is thus achieved. Also, since the cycle of the loader is controlled directly by the table, there is no possibility of lack of synchronism between them despite either inadvertent or deliberate changes in table speed.

At station B, the electric driving motor 38 is connected to a worm and wheel 55 which is, in turn, connected through speed-change pick-off gears 56 and a worm 57 and worm wheel 57a with the continuously rotated work supporting table 30. An overload slip connection 59 is provided between the shaft 58 and the gearing 55. The intermediate shaft 58 also drives bevel gears 60 and intermediate gearing 61 with a worm 62 meshing with a worm wheel 63 on the driving pulley 64 of the second conveyor belt 28. The second loader 29 is reciprocated by a barrel cam 65 generally identical with the barrel cam 51 of the first loader. In the present instance, the cam 65 is rotated by meshing gears 66—67 operatively connected to the intermediate gearing 61 by a single revolution clutch 68. This clutch is tripped by the table 30 as will hereinafter appear in greater detail so that the loader 29 shuttles a fresh work piece 20 into each successive work holder on the periphery of the table 30.

The electric motor 38 at station B also serves to drive the unloader and turn-around table 35. For this purpose, the worm wheel 63 is connected through an intermediate shaft 69 and bevel gears 70 with a gear 71 meshing with a second gear 72 fixed to a vertical shaft 73. This latter shaft 73 carries a mutilated pinion 74 on its upper end meshing with a gear wheel 75 fixed on the rotatable unloader table 35. A segmental cam 76 fast on the vertical shaft 73 cooperates with a peripherally notched cam disk 77 fixed to the gear 75 to complete a Geneva type movement for the table 35. By the use of this type of drive movement, a step-by-step rotation of the unloader table 35 is obtained in timed relation with the continuous rotation of the table 30. The table 35 dwells in each rest position and is then shifted quickly into its next position after having received a machined work piece 20 from the table 30. The third conveyor belt 36 may be driven by an electric motor at the next succeeding machining station or in any suitable manner.

*First loading fixture*

Precise positioning of the work pieces during loading and movement of the pieces at speeds greater than those of the conveyor or table are requisite in the loading operation particularly in view of the character of the machining operations being performed and the fact that the work pieces are placed in closely spaced relation on a continuously moving table. To this end, the loader 22 takes positive control of the work pieces 20 delivered thereto by the conveyor 21 and advances several of the pieces step-by-step to project the leading piece of the group onto the table 23. By moving the work pieces through several successive steps, that is, retaining them in the loader 22 during a plurality of advancing steps, better control of both the work piece position and timing are achieved. The loader advances the work pieces along a path substantially tangent to the table 23 so that side edges 20ᵈ of each work piece will be exposed when the piece has been transferred to its fixture on the table.

In the particular construction shown (Figs. 3 to 6), the loader 22 operates with a reciprocatory or shuttle action and embodies a slide 78 reciprocable on a bed 79 and driven by the barrel cam 51 through the medium of the single revolution clutch 54. The drive from the cam 51 to the slide 78 is formed by a cam follower roller 80 (Fig. 5) on the lower side of the slide which rides in the groove 51ᵃ in the surface of the barrel cam. The slide 78 is generally U shaped, as viewed from the top (Fig. 3) with its legs extending toward and embracing the entering end of the conveyor belt 21. A generally rectangular top plate 81 (Figs. 4 and 6) overlies the slide 78 in spaced relation and is stationarily supported by posts 82 upstanding from the bed 79. This top plate 81 has a plurality of apertures 83 herein (Fig. 4) which expose to view the successive work pieces 20 passing through the loader.

Two sets of pivoted fingers on the slide 78 and top plate 81 respectively serve to guide and advance the work pieces 20 through the loader and advance the same from the belt 21 onto a stationary plate 99 (Figs. 3 and 5) the upper surface of which is disposed slightly below the level of the belt. The upper set of fingers are simply detents while the lower set act as work guiding and advancing pawls. The latter are shown herein (Figs. 3 and 6) in the form of bell cranks 84 pivoted on the opposite sides of the slide 78. Each of these bell cranks includes a first arm 85 having an enlarged and rounded head 86 thereon as well as a second arm 87. The arms 87 of the first pair of bell cranks are free to swing individually while the arms 87ᵃ of the other bell cranks are pivotally interconnected on each side of the line of work pieces 20 by links 88 so that the groups of bell cranks 84 will oscillate together. By providing individual rocking of the first set of bell cranks, opening of the arms by an entering iron from the conveyor will not be transmitted to the group of irons already spaced.

Upon reference to Fig. 3, it will be seen that the bell cranks 84 are arranged in pairs so that the arms 85 thereof constitute opposed pawls or jaws engageable with the work pieces 20. Tension springs 91 and 91ᵃ anchored at their opposite ends to the arms 87 and 87ᵃ and to the slide 78 yieldably urge the opposed bell crank arms 85 toward each other. Accordingly, during the forward stroke of the slide 78 (to the right as viewed in Fig. 3), the enlarged heads 86 on the pawl arms 85 engage the butt end 20ᶜ of the preceding work piece so as to shove it forward or to the right. At the same time, flat surfaces 86ᵃ on the heads 86 engage the nose of the next succeeding work piece and hold the latter against lateral movement and out of contact with the preceding piece. During the return stroke of the slide 78, the work pieces are held against a return movement by a second set of pawls or detents (as will appear hereinafter), and the bell cranks 84 are returned to their initial position. In this movement, the pawls 85 are pushed apart as their surfaces 86ᵃ ride along the convex sides of the work pieces. As soon as the heads 86 reach the butt end of the work piece, however, they ride off and are snapped in behind the end 20ᶜ by the springs 91 so that they again assume the initial position shown in Fig. 3. In this way, the work pieces 20 are advanced step-by-step through the loader rapidly while being accurately and carefully guided by the pawls 85 and held out of contact with each other.

The cooperating set of pawls or detents for the loader are shown herein (Figs. 4 and 6) as fingers 92 having heads 93 thereon shaped generally the same as the heads 86 on the pawls 85. In the present instance, however, the fingers or detents 92 are pivoted at 92ᵃ on the fixed top plate 81 and the pivots are located directly above the heads 86 when the latter are in retracted position so that the heads 93 will engage the butt ends 20ᶜ and hold all of the work pieces in the loader against backward movement during return of the slide 78. As in the case of the first set of pawls described, the fingers 92 are arranged in opposite pairs and are interconnected by pantograph linkages including links 94 rigid with the respective pawls and interconnected by pivoted cross links 95. The fingers 92 making up each pair are urged toward each other by tension springs 96 anchored to the top plate 81.

During the forward stroke of the slide 78, the fingers 92 ride along the sides of the advancing work pieces 20 which pass between them and guide these work pieces during such advancing movement. At the termination of each advancing step, the heads 93 of the fingers 92 move in behind the work pieces under the action of the springs 96. Then, during the subsequent return stroke of the slide 78, the work pieces 20 are held by the detents 92 against rearward displacement which might otherwise be caused by the friction of the pawls 85 riding along their sides in returning to their initial positions. Any tendency of the work pieces to over-travel is overcome by a finger 81ᵃ (Figs. 5 and 7) urged downwardly by a spring 81ᵃ against the leading work piece in the loader. The lower end of the finger is forked to straddle the nose of the leading work piece and thereby hold it in correct lateral position. Positive and accurate positioning of the work pieces 20 throughout their movement through the loader 22 is thus assured.

The final transfer of the work pieces 20 from the loader 22 to the rotating work table 23 is accomplished with the aid of an auxiliary loader, designated generally by the numeral 97 (Figs. 3, 4 and 7). This loader includes a jaw 98 pivoted at 98ᵃ on the upper surface of a loading skid plate 99 on the machine base and carrying spring fingers 98ᵇ which define a yieldable face curved to conform to the side edges of the work pieces 20. The jaw 98 is yieldably urged toward the table 23 (Fig. 7) by means of a tension spring 100 connected to an arm 101 on the jaw 98.

Projecting from the forward end of the slide 78 is a rod 102 (Fig. 3) carrying a head 102ᵃ guided by the plate 99 and carrying parallel bars 103 and 104. After a short advance of the slide 78 during its forward stroke, the cam-shaped end 103ᵃ of the bar 103 engages an arm 103ᵇ on the jaw 98 and swings the latter away from the table to the position shown in Fig. 4 thereby permitting the work piece to enter a pocket on the table 23. The bar 104 has rack teeth thereon meshing with a gear 104ᵃ which, during advance of the slide 78, rotates a pinion 104ᵇ to project a rack bar 104ᶜ meshing therewith into the path of the nose on the work piece being loaded. In the final portion of the loader stroke, the work piece being loaded moves from the feed line position (Fig. 4) to that shown in dot-dash outline, the nose of the piece engages the end of the bar 104c and is cammed outwardly thereby delaying entry of the nose of the work piece and permitting the butt end of the work piece to shift inwardly along a locating button 116 after passing stationary guide lugs 104d. Then, during the return stroke of the loader slide, the bar 104c is retracted and the jaw 98 is permitted to swing inwardly by the spring 100. During this movement, the spring fingers 98b bear against the outer side 20d of the work piece and swing the nose inwardly and shift the entire piece bodily onto a hardened plate 138 defining the table top. The nose finally comes against the front locating button 116a and an inner abutment defined by a flange 117 upstanding from the table 23. Thus, the buttons 116 and 116a cooperate with the flange 117 to form a pocket above the plate 138 into which pocket the work piece becomes seated to position the outer side 20d beyond the outer edge of the table and concentric with the axis thereof.

High speed actuation of the shuttle loader 22 is achieved through the use of the single revolution trip type clutch 54 previously noted which insures proper timing between the intermittent reciprocating motion of the loader and the continuous rotary movement of the table 23. Although the clutch may be of any desired type, it is shown herein (Fig. 6) as including a driver in the form of a ratchet wheel 105 and a driven member in the form of a pawl 106 pivoted on a rotatable spider or housing 106a which embraces the ratchet wheel (Fig. 5). A pivoted detent 107 normally engages the pawl 106 and holds it out of engagement with the ratchet wheel 105 so that the clutch is disconnected. In order to engage the clutch for one revolution of the shaft carrying the driving ratchet 105, the detent 107 is momentarily lifted from the pawl 106 so that the latter moves into engagement with the ratchet wheel 105 under the bias of a torsion spring 108. Thereafter, if the detent 107 is returned to its initial position, it will engage the pawl 106 again only after a complete revolution of the latter so that the clutch is again automatically disengaged at such time. Such disengaging movement of the detent 107 from the pawl 106 and in timed relation with the rotation of the work table 23 is accomplished by means of a series of pins 109 (Figs. 4 and 6) located in a pheripheral groove 110 in the table. These pins are located to ride under the nose of a pawl 111 pivoted on the loader bed, thereby raising it as they pass under the pawl. This pawl 111 is, in turn, connected with the detent 107 through a rock shaft 111a, a link 112, a bell crank 114, a link 113, and a crank arm 113a. Accordingly, when one of the pins 109 raises the pawl 111, the detent 107 is oscillated counterclockwise (as viewed in Fig. 6) so that it disengages the clutch pawl 106 and permits the latter to engage the ratchet wheel 105. Return movement of the detent 107 in a clockwise direction, after the pin 109 has disengaged the pawl 111, is limited by an adjustable stop 115.

Double table work support

The cooperating rotatable work tables 23 and 26 at station A (Fig. 1) serve to move the work pieces 20 through a generally S shaped or figure eight path. During the first half of this curvilinear movement, one side 20d of each work piece is exposed for milling and broaching by the cutters 24 and 24a while in the second half of the path the opposite side faces 20b of the work pieces are exposed for milling and broaching by the cutters 27 and 27a. In each case the curvature of the side face milled on the work piece is determined by the displacement of the active edge of the cutters from the center of rotation of the table which supports the work piece.

Means is provided for interrupting the movement of each work table in the event that a work piece delivered to one of the table pockets does not become fully seated therein. In the case of the table 23, this means comprises a switch 250 (Fig. 7) controlling the table drive mechanism and actuated by a feeler finger 251 which is pivoted at 252 and projects into or adjacent the normal path of movement of the work pieces by the table just beyond the loading position. Normally, the switch is held closed and operates to maintain operation of the table drive motor 37 as the work pieces fully seated in the table holders pass the feeler 251. In the event that a work piece does not seat properly and projects outwardly to a point that might result in damage to the cutter 24 or the machine, the feeler is moved sufficiently to open the switch 250 and thus disable the motor 37 as by breaking a holding circuit thereof, the motor remaining idle until the work piece is removed and the motor restarted.

Clamping mechanisms are provided for holding the work pieces in position in the pockets on each of the rotating tables 23 and 26, and since the clamp mechanisms for both tables are substantially identical, a detailed description of that for the table 23 will suffice for both. The same reference numerals have been used in Figs. 7 and 8 for substantially identical parts on the two tables. The circular flange 117 encircles an upright center post 118 on the table 23. A dome-shaped cover 120 fits about the top of each of the rotating tables and encloses the respective clamping mechanisms.

To hold the work pieces 20 on the table plate 138, a clamp shoe 121 is positioned above each of the work receiving pockets (Figs. 8 and 10). Each of these clamp shoes is pivoted by a pin 122 on the lower end of an associated clamping plunger 123 which is vertically slidable in a corresponding vertical bore in the table being guided therein by lateral ribs 123a. A horizontally slidable wedge block 124 serves to move the clamp plunger 123 vertically into and out of clamping position. The upper side of the block 124 rides beneath a back-up roller 125 carried by the table while the tapered lower surface thereof (Fig. 8) rides over a roller 126 journaled on the plunger 123. The block 124 is slidable axially upon a pin 130 fixed to the base of a horizontal yoke 131, which is disposed for limited radial movement on the table. A helical compression spring 127 encircling the pin 130 within a central longitudinal bore in the block 124 yieldably urges the block radially outward from the yoke 131. When the wedge block 124 is thrust radially outward, its tapered bottom surface rides over the roller 126 and forces the clamp plunger 123 downward. Upon withdrawal of the wedge block, however, lateral ribs 128 thereon (Fig. 10) slide along complemental tapered ledges 129 on the plunger 123 so that the latter is retracted upwardly.

In the arms of each of the yokes 131 is journaled a pin 132 having thereon two cam follower rollers 133 and 134. The rollers 133 are of slightly larger diameter than the rollers of 134. Actuation of the clamp shoes 121 into and out of clamping engagement with their respective work pieces 20 in timed relation to the rotation of the table 23 is accomplished by a pair of peripheral cams 135 and 136 keyed to the upper end of the fixed post 118 and held thereon by lock nuts 137. The cam 135 contacts the cam follower 133 while the cam 136 contacts the cam follower 134, the latter cam 136 being formed as an inwardly facing surface on an overhanging ledge embracing the roller 134. When one of the work pockets is in its loading position (Fig. 7), the cams 135 and 136 are positioned so that the yoke 131 is withdrawn inwardly and the clamping plunger 123 raised by the wedge block 124. The clamp shoe 121 is thus raised so that the work piece 20 can be slid into position in the pocket 116 on a skid plate 138 which forms the bottom wall of the pocket. Upon further rotation of the table 23, the high part of the cam 135 contacts the roller 133 (Fig. 7) so that the yoke 131 and its attached wedge block 124 are thrust radially outward and the clamp shoe 121 pressed firmly into engagement with the work piece. The clamp remains engaged during approximately the subsequent 180 degrees of table rotation and during which time the clamped work piece is roughed and finished by the cutters 24 and 24a. Thereafter, the roller 133 rides into a low portion of the cam 135 and correspondingly the roller 134 rides onto a high portion of the cam 136 so that the yoke 131 and attached wedge 124 are again drawn inward and the clamp shoe 121 raised from the work piece 20 to disengage it. It will thus be seen that the clamping mechanisms for the tables 23 and 26 are so arranged that they automatically engage successive work pieces and hold them tightly clamped on the tables for predetermined arcs of movement about the table peripheries as indicated by the legends in Fig. 1. Somewhat different sizes or shapes of work pieces can be accommodated by properly changing the positions of the locating buttons.

In order to shift the work pieces 20 from the table 23 onto the table 26, a transfer mechanism has been provided which is actuated in timed relation with movements of the table 26. This mechanism is shown herein (Fig. 7) as embodying a transfer arm 139 pivoted at 139a on the machine bed and having a dog 140 fast thereon and normally retracted by a tension spring 143 to the position shown in dot-dash outline in Fig. 7. The free end of the dog projects into the path of the pins 141 in a groove 142 fashioned in the periphery of the table 26. One pin is provided for each work receiving pocket and is so positioned with respect to its associated pocket that one of the work pieces 20 will be pushed into such pocket by the transfer arm 139 when the latter is oscillated in a clockwise direction by one of the pins 141. It will be observed that the arm 139 is disposed above the locating abutments 116a and its inner face 139c is curved to fit the inner side of the advancing work piece acting thereon to cam the nose of the piece outwardly away from the button 116a by the time the pin 141 engages the arm 140. In the transfer of the work piece, the butt end first moves in ahead of the button 116. As soon as the pin 141 passes the dog, the transfer arm 139 is returned to its initial position by a spring 143 secured to a stationary lug 144.

To assist in the final transfer of the work piece to the table 26 and proper seating in a pocket thereon, a shoe 145 is mounted adjacent the table beyond the transfer point and carries spring fingers 146 which engage the side 20b of the transferred piece and yieldably cam the piece into final position.

As a precaution, provision is made for positively retracting the transfer arm 139 in the event that the spring 143 fails. This includes projections 147 (Fig. 7) carried by the table 23 in positions to engage a lug 148 on the transfer arm and swing the latter in ahead of the next work piece.

After the work pieces have been accurately located on the second work table 26, they are clamped in position by cooperating clamping shoes 121 (Fig. 8) which are actuated in timed relation with the rotation of the table just as in the case of the similar clamps 121 on the table 23. After rotating through substantially 180 degrees, and during which rotation the cutters 27 and 27a machine the exposed edges of the work pieces 20, the latter are unclamped. Then, they are dislodged from their pockets and pushed on to the second belt conveyor 28 by a transfer finger 150 (Fig. 7) stationarily mounted and projecting into the path of the work pieces on the table 26. As the nose of each successive work piece engages the finger, the piece is cammed out of its pocket and slid onto the conveyor.

The close spacing of the successive work pieces on the tables 23 and 26 will be apparent from an inspection of Fig. 7. By virtue of this, the milling cutters 24 and 27 and the broaches operate continuously thereby increasing the speed of the milling operation.

*Sizing mechanism*

Mechanism is provided which operates automatically during the transfer of the work pieces from station A to station B to measure at least one dimension of each work piece and to withdraw from the stream any work pieces which are not of a size to fit properly in the fixtures at the next station. More particularly, the mechanism operates in the present instance to measure the width of the work pieces and eject any which are undersize.

As shown in Figs. 16 and 17, the sizing mechanism includes two fingers 201 swingable horizontally about stationary pivots 202 on opposite sides of the conveyor 28 and projecting in the direction of advance of the work pieces and partially across the path thereof. The hubs of the fingers carry arms 203 connected by a link 204 and one having a second arm 205 which is urged by a spring 206a in a direction to swing the fingers toward each other. The free end of the arm 205 is joined by a link 206 and a lost motion connection 207 to the end of a crank arm 208 pivoted at 209 and rigid with a gate 210. The latter projects from its pivot in a direction opposite from the work advance and is swingable back and forth across the path of the work pieces carried by the conveyor 28. If the gate is disposed in the full line position as a work piece moves beyond its free end, the piece is permitted to continue along its normal path. But, when the piece is undersize, the gate is permitted to move across the conveyor belt to the inclined position shown in dotted outline. In this position, the gate will be engaged by the work piece and will, during advance of the latter by the belt 28, cam the piece laterally off from the belt.

Such control of the gate position is governed by a device for automatically measuring the width of each moving work piece. This device includes two feelers 211 and 212 mounted on opposite sides of the conveyor 28 to engage the opposite machined sides 20ᵇ and 20ᵈ of the work piece at the widest part of the latter just as the butt end 20ᶜ passes the fingers 201 as shown in Fig. 16. The finger 211 is stationary while the finger 212 is guided in a frame 213 for endwise movement. Upstanding from the outer end of the finger 212 is a pin 214 connected to a short arm of a bell crank 215 pivoted at 216ᵃ. The long arm is connected by a link 216 to a latch 217 pivoted at 218 and engageable with a projection 219 on the gate 210. When the work piece is of the correct width as is the one shown in Fig. 16, the feeler 212 will be moved by the work piece advancing along the conveyor and hold the latch 217 against the action of a light spring 220 in the position shown. This condition exists at the time the work piece passes the fingers 201 so that the gate 210 is held by the latch 217 out of the path of the work piece and the latter is allowed to be carried on by the conveyor 28 to the next work station. If, however, the work piece is slightly undersize, as determined by the selected spacing feelers 211 and 212, the latch 217 will be held out of blocking relation with respect to the gate and the latter will be permitted to move under the action of the spring 206 into the dotted position (Fig. 16) as the work piece passes the fingers 201. In such a case, the advancing work piece will engage the inclined gate and be cammed thereby off from the conveyor.

To avoid the necessity of the gate moving against the work path after the work piece passes the feelers 211 and 212, a second latch 221 pivoted at 218 is arranged to be disposed in blocking position with respect to the gate in all positions of the work piece on the conveyor except the one shown in Fig. 16. This latch is moved to blocking position by a spring 222 and is connected by a link 223 to the long arm of a bell crank 224 pivoted at 225. The short bell crank arm is connected to a slidable bar 226 pivotally joined at 229 to a yoke 227 having fingers 228 engageable with the machine surface 20ᵇ on opposite sides of the feeler 212.

It will be seen from Fig. 16 that when the work piece is in measuring position, both fingers 228 engage the work shifting the yoke 227 outwardly and thus retracting the latch 221 so that the gate is at this time under the control of the latch 217. After the measuring operation and when the work piece advances beyond the rear finger 228, the latter moves in behind the work piece and the resulting pivotal movement of the yoke 227 permits movement of the latch 221 by the spring 222 into a position to engage the projection 219. This movement of the latch 221 of course occurs before the normal retraction of the latch 217 as the widest portion of the work piece passes the feeler 212. The projection 219 has a cam surface 230 which engages a complemental surface 231 on the latches and cams the latter out of the way when the gate is swung back to normal position by the fingers 201 following ejection of an undersize work piece.

For some work pieces, particularly those which are of relatively light weight, it may be desirable to provide means for increasing the driving friction between the work pieces and the conveyor by which they are advanced through the sizing mechanism. Such a means may take the form of a downwardly urged roller 240 (Fig. 18) under which each work piece rides and by which the piece is engaged while it is in operative engagement with the sizing mechanism. Herein the roller is fast on a shaft 241 journaled in bearings 242 on the free ends of two arms 243 which are pivoted on a shaft 244. The roller is thus urged downwardly by its own weight and that of its supporting arms. Preferably, the roller is driven in synchronism with the conveyor 28 as by belts 245 and 246 and pulleys connecting the shaft 241 with a drive pulley 247 driven from one of the pulleys by which the conveyor belt 28 is advanced or supported.

*Second station*

At the second metal-removing station B (Fig. 1), the work pieces 20 are again received in a continuous stream from the conveyor belt 28 and advanced with a step-by-step movement through the shuttle loader 29 onto the continuously rotating work table 30. In this case, however, the work pieces are thrust radially inward onto the work table so as to expose the butt ends 20ᶜ thereof. The loader 29 at station B is substantially identical with the first loader 22 and, hence, a detailed description would be mere repetition and is unnecessary. In general, the loader 29 is actuated in timed relation with the rotation of the table 30 so that a fresh work piece is thrust into each successive work receiving pocket presented to the loader by the table and without interruption in the table movement. To accomplish this timed actuation, a series of pins 151 (Figs. 11 and 12) are secured to the periphery of the table at spaced points to actuate a cooperating dog 152 which, in turn, trips the single revolution driving clutch 68 (Fig. 2) of the loader 29. One pin is, of course, provided for each of the work receiving pockets or holders on the table 30.

An auxiliary loader, designated generally by the numeral 153 (Fig. 11) firmly seats the work pieces 20 in the work receiving pockets on the table 30. This auxiliary loader generally resembles the auxiliary loader 97 at station A and embodies a jaw 154 pivoted on a supporting block 155, the jaw having a curved inner face conforming to the contour of the exposed butt ends of the work pieces. A tapered nose 154ᵃ on the jaw cams the jaw over the butt ends of the work pieces upon engagement therewith. A helical compression spring 156 yieldably urges the jaw 154 toward the work pieces so that the jaw presses the work pieces into the complemental work holder pockets.

To clamp the work pieces 20 on the table and locate them accurately thereon, a work locating and clamping mechanism is provided embodying a circular casting 157 (Fig. 12) bolted to the top of the table 30 and formed with a series (herein shown as twenty-two in number) of work-receiving pockets 158. At each of these pockets, two undercut lugs 159 (Fig. 11) are provided at the inner end to receive the nose of the work piece while an undercut lug 160 engages one side of the work piece near its butt end. The opposite side of each work piece is gripped by a clamping shoe 161 having an undercut inner face complementing the taper on the milled side edge of the work piece. This form of clamping mechanism exposes not only the butt of the work piece for machining, but also the top surface thereof. By first milling the tapered or beveled side edges on the flatiron shoes, they are conditioned for easy gripping to expose the butt end and top as described.

Each of the clamp shoes 161 is screwed to the upper end of a corresponding clamp plunger 162 vertically slidable in the fixture casting 157 (Fig. 12). Pins 163 fixed in the casting 157 extend through vertical slots 164 in the plungers 162 to limit the latter's vertical movement. To urge the plungers 162 downwardly so as to engage the clamp shoes 161 with the work pieces 20, helical compression springs 165 are positioned in axial bores formed in the plungers and interposed between the pins 163 and stops 166 threaded in the plunger bores.

A timed actuation of the clamps with respect to the rotation of the table 30 is accomplished by a cam actuating mechanism. This latter mechanism embodies cam follower rollers 167 journaled on the lower ends of the plungers 162 and riding on the contoured upper surface of a generally circular cam track 168. This cam track is bolted to a stationary annular casting 169 encircling the rotating table 30 (Fig. 12) When the rollers 167 are in engagement with the relieved portions of the cam track 168, the plungers 162 are depressed and the clamp shoes 161 engage the work pieces 20. Then as the rollers 167 ride up on the high part 168ª of the cam track (Fig. 14), the plungers 162 are thrust upwardly and against the bias of the compression springs 165 so that the shoes 161 are lifted and disengage the work pieces. The series of work pieces on the table 30 are thus successively clamped and unclamped in timed relation with the table rotation. Preferably, the work pieces are clamped during approximately 270 degrees of their movement about the axis of the table so that a series of successive machining operations may be performed at spaced points while they are clamped.

Positive clamping of the work pieces 30 is further insured by locking the clamp plungers 162 in their clamped position. For this purpose, compound wedges 170 (Figs. 13 to 15) are arranged for sliding movement in radial bores 171 in the fixture casting 157 so as to engage complemental tapered noses 172 in the clamp plungers 162. The tapered plungers 170 are urged radially outward into a position of engagement with the plungers 162 by helical compression springs 173 located in the bores 171. As a means of retracting the locking plungers 170 in timed relation with the table rotation, a pivoted link 174 is arranged to cooperate with each of these plungers. Each of these links is pivoted on a bracket 175 fast on the lower side of the fixture casting 157 and has a head disposed within a recess 176 in the plungers 170 (Fig. 15). The cam follower rollers 177 on the lower ends of the links 174 contact the contoured outer surface of a generally circular peripheral unlocking cam 178. This cam track 178 is contoured to oscillate the links 174 clockwise (as viewed in Fig. 15) and thereby disengage the locking plungers 170 from the clamp plungers 162 just prior to the unclamping movement of the latter. Similarly, the cam track 178 permits the springs 173 to thrust the locking plungers 170 into engagement with the clamp plungers 162 just after the latter have been shifted to their clamping position by their cooperating cam and cam follower rollers 168—167. It will be appreciated that both the clamping and clamp locking mechanisms are actuated in timed relation with the rotation of the table 30 irrespective of variations in the speed of table rotation.

As the table 30 rotates, a plurality of machining operations are performed upon the work pieces 20 clamped thereon (Fig. 1). In particular, the milling cutter 31 and the broach 31ᵇ machine the butt ends of the work pieces and thereafter the buffers 33 and 34 polish these surfaces. During this same rotative movement, the pads 20ª on the tops of the work pieces are machined by the rotatable face milling cutter 31ª.

Ejection of the work pieces 20 from the table 30 is also accomplished in timed relation with the table rotation. Since the loader 29 is also operated in timed relation with table rotation and at the same periodicity as the unloading operation, both the loader and unloader may be conveniently operated in synchronism from a common source of power. For this purpose, a yoke 179 (Fig. 11) is secured to the top of the reciprocating slide 78 of the loader 29 and has secured to it a bar 180 reciprocable in a casing 181. This casing is, in turn, fixed to a generally circular stationary housing 182 which covers the central portion of the table 30. A rack 183 fashioned on the inner end of the rod 180 meshes with a pinion 184 which is journaled for rotation at the axis of the table. This pinion, in turn, meshes with a second rack on a rod 185 reciprocable along a path angularly disposed with respect to the first rod 180. The periodic reciprocation of the rod 185, resulting from corresponding reciprocation of the loader slide, is utilized for ejecting successive work pieces from the table. For this purpose, an ejector plunger 186 is provided for each of the work receiving pockets 158 and is arranged to slide radially into and out of the pocket. It should be noted that the plunger 186 is carried by the rotating fixture casting 157 while the rod 185 is non-rotatable, being reciprocatable on the stationary central housing 182. A head 185ª is arranged on the end of the rod 185 to register with successive ones of plungers 186 as the latter reach their unloading position. Complemental notches 188 and 189 are formed on the adjacent ends of the rod head 185ª and the plungers 186 respectively (Fig. 12) so that the rod head 185ª is operatively connected to successive ones of the ejector plungers 186. During the time of its engagement with each of these successive ejector plungers 186, the rod 185 is reciprocated through the medium of the rack 183 and pinion 184, so that a quick reciprocatory motion is imparted to the alined one of the ejector plungers 186 and the associated work piece 20 is pushed from the pocket in which it was previously mounted.

*Unloading fixture*

Two important purposes are fulfilled by the unloading fixture 35. First, it serves to turn each of the work pieces 20 individually about a vertical axis through 315 degrees so that they advance toward the next station nose foremost. Second, it enables the stream of work pieces to be dispatched in any desired direction as they leave the station B. The first function is particularly important in the case of irregularly shaped work pieces which must be passed to the next machining station in a manner such that they can be located in predetermined positions for machining. The second function greatly increases the flexibility of the line-up and makes it possible to locate the various parts of the machining apparatus so that they will fit within an available factory floor space of almost any layout.

The unloading fixture 35 has been shown herein (Fig. 9) as embodying a revolvable star plate 190 having peripheral work receiving pockets or notches 191 therein and overlying a stationary skid plate 192 having a notch therein at 193 over the end of the conveyor belt 36. Upon being thrust into the pockets 191, each work piece 20 is slid around the surface of a skid plate 192 by the rotation of the star plate 190 until the piece reaches an opening at 193 through which it drops onto the continuously moving conveyor belt 36, the star wheel dwelling in rest position for a length of time sufficient to allow the piece to be carried out of the pocket 193. A guide finger 36ᵃ on the side of the conveyor frame is arranged to engage the noses of any work pieces which may inadvertently be projecting beyond the periphery of the skid plate and push them back into the pockets 191. In this way, jamming of the work pieces against the end of the conveyor is prevented and at the same time, the work pieces are evenly spaced on the conveyor belt. The adjacent end of the conveyor belt 36 is carried by a pulley journaled in a bracket 36ᵇ upon which the skid plate 192 is mounted.

The skid plate 192 may be made adjustable angularly about its center so that the opening at 193 therein can be located in registry with the conveyor belt 36 no matter what the angular disposition of the latter may be with respect to the center of the unloader fixture. Consequently, by this simple adjustment of the angular position of the skid plate, the unloader fixture can be conditioned to send off the work pieces in any desired direction throughout an arc of approximately 170 degrees. As shown herein (Fig. 9), the skid plate is mounted upon the bracket 36ᵇ leaving a depending annular flange 36ᶜ thereon. The flange is split on one side and the adjacent ends are pulled together by bolts 36ᵈ so that the bracket may be clamped to the circular support 169ᵃ in the desired angular position. The support 169ᵃ also provides a housing for the drive mechanism for the star wheel 190 and the lower portion thereof is bolted to the casting 169.

Cross bars 194 overlie the pockets 191 in the rotating star plate 190 so that the work pieces 20 will not be thrown upwardly out of the pockets when thrust into them. In a similar manner, a friction gripping device (not shown) may be attached to the bars 194 so as to engage the work pieces 20 and prevent them from bouncing out of the pockets when shoved into them. The outer corners of the side walls of the pockets 191 are preferably rounded, as shown in Fig. 9, so that the work pieces will move smoothly into them, despite any slight imperfections in alinement.

The Geneva movement drive for the revolvable star plate 190 embodies, as was previously noted, the mutilated pinion 74 (Fig. 9). This pinion is rotated at constant speed through the medium of gears 71—72, by the same motor which drives the work supporting table 30 so that the two rotate in synchronism. The mutilated pinion 74 meshes with a gear 75 fixed to the underside of the star wheel 190 and journaled on a vertical shaft 195. During the periodic intervals of dwell in which the star wheel 190 is at rest, it is held against rotation by the segmental cam 76 fast on the pinion 74 which engages complemental peripheral depressions in the cam disk 77. With such a driving arrangement, the star plate 190 is indexed step-by-step in timed relation with the continuously rotating table 30. The gear connections for the table 30 and fixture 35 are so chosen that one of the pockets 191 in the star plate 190 will be presented to each of the pockets 158 on the table 30 at the instant the work piece is ejected from the latter.

We claim as our invention:

1. A machine tool organization comprising, in combination, a series of work holders movable in an orbital path, power actuated means for moving said work holders in said path continuously and at a substantially constant speed, a conveyor for supplying a succession of work pieces in a substantially continuous stream, a metal-removing tool disposed for operative engagement with succeeding work pieces in said work holders, a loader for receiving work pieces from said stream and for locating them in accurately alined and closely spaced relation while advancing them step-by-step through a predetermined series of steps toward said series of work holders and finally into said work holders, and means for actuating said loader intermittently in timed relation with the movement of said work holders to project work pieces into the successive work holders as the latter are presented to the loader.

2. A machine tool organization comprising, in combination, a series of work holders movable in an orbital path, power actuated means for moving said work holders in said path continuously and at a substantially constant speed, a conveyor for supplying a succession of work pieces in a substantially continuous stream, a metal-removing tool disposed for operative engagement with succeeding work pieces in said work holders, a loader for receiving work pieces from said stream, holding a series of pieces in a line and transferring the leading pieces into one of said work holders, means for actuating said loader intermittently in timed relation with the movement of said series of work holders, and auxiliary loader means for seating the work pieces accurately in said work holders after their transfer thereto by said first named loader.

3. A machine tool organization comprising, in combination, a rotatable work supporting table, power actuated means for rotating said table continuously and at a substantially constant speed, a series of work holders carried by said table and disposed thereon in circumferentially spaced relation, means operable during the advance of said table to perform a metal-removing operation on the work pieces secured in said holders, a loader slide mounted for reciprocation adjacent said table, means including a plurality of pivoted pawls on said slide and a cooperating set of non-reciprocating pivoted detents for advancing work pieces step-by-step through a predetermined series of steps toward said table and finally into said work holders while maintaining the work pieces in accurately alined and spaced relation, and power actuated means for reciprocating said slide in timed relation with the rotation of said table.

4. A machine tool organization comprising, in combination, a series of work holders movable in an orbital path, power actuated means for moving said work holders in said path continuously and at a substantially constant speed, a continuously moving conveyor for advancing a succession of work pieces toward said holders, a metal-removing tool disposed for operative engagement with succeeding work pieces in said work holders, means receiving work pieces from said conveyor and operating to transfer the work pieces into successive ones of said work holders at a speed substantially greater than that of said conveyor or said holders, and means for actuating said transfer means intermittently and rapidly in timed relation to the movement of said work holders.

5. A machine tool organization comprising, a rotatable work supporting table, power actuated means for continuously rotating said table at a substantially constant speed, a plurality of work holders arranged in circumferentially spaced relation on said table, a metal-removing tool disposed for operative engagement with a succession of work pieces held in predetermined position by said work holders, and a loader for transferring work pieces into the holders on said table in predetermined angular position relative to each holder and means for operating said loader in timed relation to the rotation of said table without interrupting the movement of the latter.

6. A machine tool organization comprising, in combination, a series of work holders movable in an orbital path, power actuated means for moving said work holders in said path continuously and at a substantially constant speed, a conveyor for supplying a succession of work pieces in a substantially continuous stream, a metal removing tool disposed for operative engagement with succeeding work pieces in said work holders, transfer means receiving work pieces from said conveyor and operating to project the pieces one by one and with a rapid motion into the successive work holders, a power actuated means for driving said transfer means, means including a single revolution clutch for connecting said power actuated means in driving relation with said transfer means, and means for engaging said clutch in timed relation with the movement of said series of work holders.

7. A machine tool organization having, in combination, a work table rotable continuously about an upright axis and having pockets thereon for receiving work pieces in a predetermined angular position, said pockets opening outwardly in a radial direction, a metal removing tool associated with said table for machining the successive work pieces presented thereto by the table, a continuously moving conveyor for carrying work pieces successively to said work table, and a power actuated loading mechanism for receiving the work pieces from said conveyor and operable intermittently in timed relation to the movement of the work table to impart movement to each work piece at a rate substantially greater than the speed of the table and thereby transfer the work piece into the table pocket while the latter is in motion, said mechanism retaining positive control over the position of each work piece during such transfer.

8. A machine tool organization having, in combination, a metal removing tool, a work table adjacent said tool rotatable about an upright axis and having laterally opening pockets spaced therearound to receive work pieces with one side thereof exposed for machining by said tool, mechanism operated in timed relation to the rotation of said table to move work pieces in a path generally tangentially of said table to bring successive work pieces to a predetermined position past which said pockets move successively, and means operated in timed relation to the operation of said table and said mechanism to transfer each work piece laterally from said mechanism into a pocket on the table.

9. A machine tool organization having, in combination, a metal removing tool, a work table adjacent said tool rotatable about an upright axis and having laterally opening fixture pockets shaped to fit one side portion of a work piece with one side thereof exposed for machining by said tool, mechanism operated in timed relation to the rotation of said table to move work pieces in a path generally tangentially of said table to bring successive work pieces to a predetermined position past which said pockets move successively while retaining positive control over the angular position of each work piece about an upright axis so as to position each work piece, and means operated in timed relation to the operation of said table and said mechanism to transfer each work piece laterally from said mechanism into a pocket on the table.

10. A machine tool organization comprising, in combination, a series of work holders movable through an orbital path, power actuated means for moving said work holders through said path continuously and at a substantially constant speed, loader means operative in timed relation with the movement of said work holders for injecting work pieces into successive work holders, a releasable clamp associated with each of said work holders, power actuated means for sequentially engaging and releasing said clamps in timed relation with the movement of said work holders through said orbital path and subsequent to the work piece injection by said loader, and means for machining the work pieces clamped in said work holders during the period in which said clamps are engaged.

11. A machine tool organization having, in combination, a metal removing tool, a work table adjacent said tool rotatable about an upright axis and having laterally opening pockets spaced therearound to receive work pieces with one side thereof exposed for machining by said tool, mechanism operated in timed relation to the rotation of said table to move work pieces in a path generally tangentially of said table to bring successive work pieces to a predetermined position past which said pockets move successively, and a shoe positioned to engage the outer side of the work piece advanced by said mechanism and operable to shift the work piece laterally and seat the same in a pocket on the table.

12. A machining apparatus comprising, in combination, a rotatable work supporting table, power actuated means for rotating said table continuously and at a substantially constant speed, a conveyor for supplying a succession of work pieces in a substantially continuous stream, a loader for receiving work pieces from said conveyor and transferring the same one by one onto said table by movement along a predetermined path, an auxiliary loader operable automatically as an incident to projection of a work piece by said first loader to position the piece accurately on the table, and means located adjacent said table and beyond said auxiliary loader for machining successive work pieces located on said table by said auxiliary loader.

13. A machine tool organization comprising, in combination, a rotatable work supporting table, power actuated means for rotating said table continuously and at a substantially constant speed, a series of work holders carried by said table in circumferentially spaced relationship thereon, a loader disposed adjacent said table for thrusting work pieces toward and onto the table and into the successive work holders, means spaced from said loader about the periphery of said table for ejecting the work pieces from successive work holders, means disposed between said loader and ejector for machining successive work pieces carried by said work holders, and power actuated means for actuating said loader and ejector in timed relation with the rotation of said table.

14. A machine tool organization having in combination, a metal-removing tool, a rotary work table having laterally opening pockets spaced therearound to receive work pieces with one side thereof exposed for machining by said tool, mechanism operated in timed relation to the rotation of said table to move work pieces in a path generally tangentially of said table to bring successive work pieces to a predetermined position past which said pockets move successively, means operated in timed relation to the operation of said table and said mechanism to transfer each work piece laterally from said mechanism into a pocket on the table, and means engageable with the leading end of the work piece to delay shifting of such end into the table pocket until after the trailing end has entered the pocket.

15. A machine tool organization comprising, in combination, two work supporting tables disposed adjacent each other and rotatable about vertical axes, power actuated means for rotating said tables in synchronism and in opposite directions, a series of outwardly opening work holders disposed in circumferentially spaced relation on each of said tables, a transfer member disposed for engagement with successive work pieces on one of said tables, means for periodically moving said transfer member toward the other table in timed relation with the rotation of the latter to shift successive work pieces from said one table to said other table, and an auxiliary guide member operable on each transferred work piece to effect final accurate location thereof in a holder on said other table.

16. A machine tool organization having, in combination, a work table rotatable about an upright axis and having radially opening pockets for receiving work pieces in a predetermined angular position, a metal removing tool for machining the successive work pieces presented thereto by the table, a conveyor for carrying work pieces toward said work table, and a power actuated loading mechanism receiving the work pieces from said conveyor and operable intermittently in timed relation to the movement of the work table to cause the advance of a plurality of work pieces in a line toward the table and to transfer the leading work pieces on the line radially into a pocket on the table.

17. A machining apparatus comprising, in combination, a series of work holders movable through an orbital path, power actuated means for moving said work holders continuously through said path and at a substantially constant speed, work piece loading and unloading devices located at spaced points along said path, a metal-removing tool disposed between said loading and unloading devices in position for operative engagement with the work pieces carried by said work holders, and common power actuated means for actuating said loader and unloader devices in timed relation with the movement of said work holders.

18. A machine tool organization comprising, in combination, a series of work holders movable through an orbital path, power actuated means for moving said work holders continuously through said path and at a substantially constant speed, work piece loading and unloading devices located at spaced points along said path, a metal-removing tool disposed between said loading and unloading devices in position for operative engagement with work pieces carried by said work holders, a common actuator for said loader and unloader devices including a single revolution clutch, and means movable with said series of work holders operative to trip said clutch periodically in timed relation with the successive registration of said work holders with said loader and unloader devices.

19. In an apparatus of the type described, the combination of a rotatable table, means for rotating said table continuously and at a substantially constant speed, a series of work holders disposed in circumferentially spaced relation on said table, a reciprocating work piece loader adjacent said table, reciprocating ejector members carried by said table and associated with individual ones of said work holders, a non-rotatable ejector actuator disposed for successive operative registration with said members during the rotation of said table, and a common power actuator means for said loader and said plunger actuator.

20. A machine tool organization having, in combination, a work table rotatable about an upright axis and having laterally opening pockets for receiving work pieces each in a predetermined angular position, a tool for performing a metal-removing operation on successive work pieces presented thereto by movement of said table, a power operated conveyor adjacent said table and beyond said tool for advancing work pieces away from the table, a rotary member between said table and said conveyor having laterally and downwardly opening work receiving recesses annularly spaced therearound and adapted to receive successive work pieces transferred out of the table pockets, means providing a surface beneath said member for supporting each work piece until it has been advanced in a circular path to a different angular position and above said conveyor, and mechanism power operated in timed relation to the movements of said table for rotating said member and transferring a work piece from said table into said recess when the latter is alined with one of said pockets.

21. In an apparatus of the type described, the combination of a rotatable work supporting table, a series of work holders disposed on said table in circumferentially spaced relation thereon, a rotatable unloader fixture adjacent the periphery of said series of work holders and provided with peripherally opening and circumferentially spaced pockets therein registrable with said work holders, means for ejecting work pieces from successive work holders into successive pockets on said unloader fixture, means for receiving work pieces from said unloader fixture pockets, and means for rotating said table and unloader in opposite directions and in timed relation.

22. In an apparatus of the type described, the combination of a rotatable work supporting table, a series of work holders carried by said table in circumferentially spaced relation thereon, a horizontal non-rotatable support located adjacent the periphery of said series of work holders, a star wheel rotatably mounted above said skid plate and having peripheral pockets therein registrable with said work holders, means for ejecting work pieces from successive work holders into successive pockets in said star wheel and onto said support, and a conveyor extending beneath an opening in said support and said pockets, whereby the work pieces moved around said support by said star wheel fall through said opening onto said conveyor.

23. A machine tool organization having, in combination, a work table rotatable about an upright axis and having laterally opening pockets for receiving work pieces each in a predetermined angular position relative to its central axis, a tool for performing a metal-removing operation on successive work pieces presented thereto by said table, a power operated conveyor adjacent said table and beyond said tool and operable to advance work pieces delivered thereto away from the table, a rotary member between said table and said conveyor having laterally opening recesses annularly spaced therearound, each pocket being adapted to receive a work piece from the table when alined with one of said pockets and deliver such work piece to said conveyor in a different angular position, mechanism power operated in timed relation to the movements of said table for rotating said member and for transferring a work piece from said table into said recess when the latter is alined with one of said pockets.

24. A machine tool organization having, in combination, a work table rotatable about a vertical axis and having laterally opening pockets for receiving work pieces each in a predetermined angular position relative to its upright axis, a tool for performing a metal-removing operation on successive work pieces presented thereto by said table, a power operated conveyor adjacent said table and beyond said tool movable in a direction to carry work pieces deposited thereon away from the table, a member between said table and said conveyor having a laterally opening work receiving recess therein and mounted for movement between a position in which said recess is alined with one of said pockets to a position for depositing the work piece onto said conveyor in a different angular position relative to said upright axis, mechanism power operated in timed relation to the movements of said table for transferring a work piece from said table into said recess when the latter is alined with one of said pockets and for actuating said member to deposit the work piece on said conveyor.

25. A machine tool organization having, in combination, an operating station having a continuously rotatable work table, rectilinearly movable conveyors for carrying work pieces to and from said table, mechanism for transferring the work pieces one by one from one conveyor onto said table at a speed greater than the rate of advance of the conveyor or table, means for performing a metal-removing operation on the work pieces while the latter are held on and being advanced by said table, means for ejecting the successive work pieces from said table at a speed greater than that of the table and after advance of the piece through a partial revolution, and rotatable carrier for receiving the ejected work pieces and operable to change the angular position of each work piece relative to the other conveyor and to deposit such piece in a predetermined angular position on the latter conveyor after a partial revolution of the carrier.

26. A machine tool organization having, in combination, a plurality of spaced operating stations each having a continuously rotatable work table, a plurality of rectilinearly movable conveyors for carrying work pieces to and from said tables and between the latter, intermittently operable mechanisms for transferring the work pieces one by one from said conveyors onto said tables, means at said stations for performing metal-removing operations on the work pieces while the latter are held on and advanced with said work tables, means for ejecting the successive work pieces from said tables, and two rotatable carriers for receiving the ejected work pieces and each operable to change the angular position of the ejected work piece relative to the succeeding conveyor and deposit such piece in a predetermined angular position on the latter conveyor.

27. A machine tool organization having, in combination, a work table rotatable about an upright axis and having laterally opening pockets for receiving work pieces each in a predetermined angular position, a tool for performing a metal-removing operation on successive work pieces on said table, a power operated conveyor adjacent said table and beyond said tool operable to advance the work pieces delivered thereto away from the table, mechanism operable in timed relation to movement of said table for ejecting successive work pieces therefrom at a point beyond said tool, and means for receiving the ejected work pieces one by one and delivering the same to said conveyor in a different angular position.

28. A machine tool organization having, in combination, a work table rotatable about an upright axis and having laterally opening pockets for receiving work pieces each in a predetermined angular position, a tool for performing a metal-removing operation on successive work pieces on said table, a power operated conveyor adjacent said table and beyond said tool operable to advance the work pieces delivered thereto away from the table, mechanism operable in timed relation to movement of said table for removing successive machined work pieces from the table, and an angularly movable member actuated in timed relation to said table and operable to receive the work pieces one by one and delivering the same to said conveyor in a different predetermined angular position.

29. A machine tool organization having, in combination, a rotary work table having laterally opening pockets for receiving work pieces, a tool for performing a metal-removing operation on successive work pieces presented thereto by said table, means for rotating said table continuously, a power operated conveyor adjacent said table and beyond said tool, mechanism operable in timed relation to movement of said table for ejecting successive work pieces therefrom at a point beyond said tool and at a speed substantially greater than the rate of advance of the work pieces by the table, means for receiving the ejected work pieces one by one delivering the same to said conveyor.

30. A machine tool organization having, in combination, two adjacent work tables rotatable about spaced upright axes and having lateral opening pockets therein to receive work pieces in different angular positions, means for rotating the tables continuously in opposite directions and in timed relation so as to bring pockets of the respective tables into registry at adjacent sides of the tables, a tool adjacent one table and operable to perform a metal-removing operation on the work pieces successively presented thereto during rotation of the table, an arm engageable with the work pieces on the other table and swingable about a stationary upright pivot to move a work piece out of a pocket on the latter table and into the registering pocket of the first table, a plurality of members on one of said tables operable to actuate said arm successively during each period of registry of the pockets on the two tables.

31. A machine tool organization having, in combination, two adjacent work tables rotatable about spaced upright axes and having lateral opening fixture pockets therein to receive work pieces in different angular positions, means for rotating the tables continuously in opposite directions and in timed relation so as to bring pockets of the respective tables into registry at adjacent sides of the tables, a tool adjacent one table and operable to perform a metal-removing operation on the work pieces successively presented thereto during rotation of the table, a transfer member movable across the paths traversed by the pockets of the two tables and operable during such movement to move a work piece out of a pocket on said other table and into a pocket on the first table whereby to expose a different side of the work piece for machining by said tool, and power operated means for actuating said transfer member periodically during the periods of registry of the pockets of the two tables.

32. A machine tool organization having, in combination, two adjacent work tables rotatable about spaced upright axes and having lateral opening pockets therein to receive work pieces in different angular positions, means for rotating the tables in timed relation so as to bring pockets of the respective tables into registry at adjacent sides of the tables, a tool adjacent one table and operable to perform a metal-removing operation on the work pieces successively presented thereto, a transfer member movable across the paths traversed by the pockets of the two tables and operable during such movement to move a work piece out of a pocket on said other table and into a pocket on the first table whereby to expose a different side of the work piece for machining by said tool, power operated means for actuating said transfer member periodically during the periods of registry of the pockets of the two tables, and a shoe engageable with each transferred work piece to cam it laterally and seat the same properly in its pocket.

33. A machine tool organization having, in combination, a plurality of work tables rotatable continuously about upright axes and having laterally opening pockets thereon for receiving work pieces in different angular positions with different sides of the work pieces exposed for machining, metal-removing tools associated with the different tables for machining said exposed sides, continuously moving conveyors for carrying work pieces successively to the work tables and from one table to the next, power actuated loading mechanisms for receiving the work pieces from conveyors and operable in timed relation to the associated work table to take positive control of the angular positions of the work pieces and project the same one by one into the moving table pockets in proper angular position, and unloading mechanisms operable to remove the machined work pieces successively from the tables and discharge the same onto the next conveyor.

34. A machine tool organization having, in combination, a plurality of work tables rotatable about upright axes and having laterally opening pockets thereon for receiving work pieces in different angular positions with different sides of the work pieces exposed for machining, metal-removing tools associated with the different tables for machining said exposed sides, conveyors for carrying work pieces successively to the work tables and from one table to the next, power actuated loading mechanisms for receiving the work pieces from conveyors and operable in timed relation to the associated work table to transfer work pieces one by one into the table pockets in said different angular positions, each mechanism retaining positive control over the position of each work piece during such transfer, and unloading mechanisms associated with each table and operable in timed relation therewith to remove the machined work pieces successively and discharge the same onto the next conveyor.

35. A machine tool organization having, in combination, two rotatable work tables each with annularly spaced pockets thereon, a work carrier between said tables for receiving work pieces machined on one of said tables and transferring such work pieces to the pockets of the other table, a metal-removing tool associated with the first table for machining the portion of each work piece which becomes seated in the pocket of the other table, mechanism operating automatically during the transfer of work pieces by said carrier to engage the successive work pieces and measure the same, and means controlled by said mechanism for removing from said carrier work pieces which will not fit properly in the pockets of said other table.

36. A machine tool organization having, in combination, two spaced work stations having fixtures for receiving work pieces in different positions, a work carrier between said stations for receiving work pieces machined in one station and transferring the pieces to the next station, tools for machining the work pieces at said stations, mechanism operating automatically during the transfer of work pieces by said carrier to measure the work pieces individually and eject from the line any pieces not adapted to fit properly in the fixture at the next station.

37. A machine tool organization having, in combination, two stations at which work pieces are machined, automatically acting means for transferring a succession of work pieces from one of said stations to the other, means engageable with the successive work pieces during such transfer to measure the same, and mechanism controlled by said last mentioned means for causing removal of those work pieces which are under a predetermined size.

38. A machine tool organization having, in combination, two stations at which work pieces are machined, automatically acting means for transferring the work pieces in succession from one of said stations to the other, means operating automatically to measure one dimension of each work piece during such transfer and causing removal from the line of those work pieces the dimension of which is less than a predetermined value.

39. A machine tool organization having, in combination, two stations at which work pieces are machined, automatically acting means for transferring the work pieces in succession from one of said stations to the other, means operating automatically to measure one dimension of each work piece during such transfer, a gate swingable into and out of the path of the work pieces being transferred and adapted when disposed in said path to divert the next work piece off from the line, and means controlled by said measuring means to control the position of said gate at the time when the measured work piece controlling the gate passes the latter.

40. A machine tool organization having, in combination, two stations at which work pieces are machined, automatically acting means for transferring the work pieces in succession from one of said stations to the other, a member for deflecting work pieces out of the path of transfer and normally urged into such path, means engageable with and actuated by each work piece passing along said path and operable to move said member out of the path, a latch adapted when in active position to hold said member against movement across said path, and mechanism operating to measure each work piece after actuation of said member thereby and hold said latch in active position while the work piece is moving past said member if the work piece is properly sized, said latch being moved to inactive position if the work piece is off-size.

41. A machine tool organization having, in combination, two stations at which work pieces are machined, a continuously moving belt conveyor for supporting a succession of work pieces and transferring the same from one of said stations to the other, means engageable with the successive work pieces during such transfer to measure the same, and mechanism controlled by said last mentioned means for causing the off-size work pieces to be removed from said conveyor, and automatically operable means for pressing each work piece against said belt during engagement thereof by said means.

42. A machine tool organization having, in combination, a metal-removing tool, power actuated carrier for supporting a succession of work pieces and advancing the same along a predetermined path to present each piece to said tool in predetermined angular position, a conveyor for transferring work pieces in predetermined different angular positions to a succeeding metal-removing station, a rotary member between said carrier and conveyor and having laterally opening work receiving pockets adapted to receive work pieces delivered thereto from said carrier, and mechanism operated in timed relation to the movement of said conveyor to rotate said member and deliver each work piece received thereby to said conveyor in said second angular position.

43. A machine tool organization having, in combination, a metal-removing tool, power actuated carrier for supporting a succession of work pieces and advancing the same along a predetermined path to present each piece to said tool in predetermined angular position, a conveyor for transferring work pieces in predetermined different angular positions to a succeeding metal-removing station, and power actuated mechanism operated automatically in timed relation to said carrier for turning each work piece about a vertical axis from the first to said second angular position.

44. A machine tool organization having, in combination, a metal-removing tool, power actuated carrier for supporting a succession of work pieces and advancing the same along a predetermined path to present each piece to said tool in predetermined angular position, a conveyor for transferring work pieces in predetermined different angular positions to a succeeding metal-removing station, and power actuated mechanism operated automatically in timed relation to said carrier for turning each work piece about a vertical axis from the first to said second angular position, said mechanism comprising a member adapted to receive the successive work pieces from said carrier and movable about an upright axis to turn each work piece to said second position and deliver the same to said conveyor.

45. A machine tool having, in combination, a rotary work table having annularly spaced holders thereon for receiving work pieces to be machined, a power operated metal-removing tool for machining the successive work pieces presented thereto in the rotation of said table, power driven mechanism for rotating said table, mechanism operable automatically to deliver work pieces one by one to the successive holders on said table at a point in advance of said tool, a feeler disposed adjacent the path of the work pieces during advance thereof to said tool and adapted to detect incorrect positioning of any work piece, and means controlled by said feeler for disabling said power driven mechanism whereby to interrupt the movement of the table before engagement of said tool with an incorrectly positioned work piece.

46. A machine tool organization having, in combination, a work table rotatable about an upright axis and having radially opening pockets for receiving work pieces in predetermined angular positions, a metal-removing tool for machining the successive work pieces presented thereto by the table, a conveyor for carrying work pieces toward said work table, a power actuated loading mechanism receiving the work pieces from said conveyor and operable intermittently in timed relation to the movement of the work table to transfer the leading work piece into a table pocket, and supplemental means operable automatically on the transferred work piece to effect final accurate positioning of the piece in the pocket.

47. A machine tool organization having, in combination, a work table rotatable about an upright axis and having radially opening pockets for receiving work pieces in predetermined angular positions, a metal-removing tool for machining the successive work pieces presented thereto by the table, a conveyor for carrying work pieces toward said work table, power actuated loading mechanism receiving the work pieces from said conveyor and operable intermittently in timed relation to the movement of the work table to transfer the leading work piece into a table pocket, and a shoe spaced circumferentially around the table from said loading mechanism for operative engagement with a transferred work piece, said shoe operating during such engagement to effect final accurate positioning of the transferred piece relative to the table and said tool.

48. A machine tool having, in combination, a work table rotatable continuously about an upright axis and having annularly spaced laterally opening pockets each adapted to receive a work piece therein and expose a side thereof for machining, a tool for performing a metal-removing operation on the exposed sides of successive work pieces, conveyor means for advancing a line of work pieces toward said table to present the leading piece for registry with the pocket openings, a member normally disposed in the path of the leading work piece and movable toward the table to transfer the leading piece into one of said pockets, and a plurality of means movable with and spaced around said table and operable to cause intermittent advance and retraction of said member in timed relation to the table movements and thereby transfer work pieces into the successive pockets presented to said member.

49. A machine tool having, in combination, a work table rotatable continuously about an upright axis and having an annularly spaced laterally opening pockets each adapted to receive a work piece therein and expose a side thereof for machining, a tool for performing a metal-removing operation on the exposed sides of successive work pieces, conveyor means for advancing a line of work pieces toward said table to present the leading piece for registry with the pocket openings, a bell crank swingable about an upright pivot adjacent said table and having one arm normally disposed in the path of the leading work piece and swingable toward the table to transfer the piece into one of said pockets, said bell crank having a second arm projecting toward the table, and shoulders carried by and spaced around said table and engageable successively with said second arm to actuate said bell crank and transfer work pieces one by one into successive pockets on said table.

50. A machine tool organization having, in combination, a work table rotatable about an upright axis and having laterally opening pockets for receiving work pieces each in a predetermined angular position about an upright axis, a tool for performing a metal-removing operation on successive work pieces on said table, a conveyor adjacent said table and beyond said tool operable to advance the work pieces delivered thereto along a predetermined path away from the table, mechanism operable in timed relation to movement of said table for ejecting successive work pieces therefrom at a point beyond said tool, and means for receiving the ejected work pieces one by one and depositing the same on said conveyor in an angular position about said upright axis different from said first mentioned position.

ALEXANDER OBERHOFFKEN.
FREDERICK J. KAMPMEIER.
HARRY M. JOHNSON.